(12) United States Patent
Ono et al.

(10) Patent No.: US 12,699,663 B2

(45) Date of Patent: Aug. 4, 2026

(54) A/D CONVERTER CONTROL CIRCUIT

(71) Applicant: Renesas Electronics Corporation, Tokyo (JP)

(72) Inventors: Akihiro Ono, Tokyo (JP); Takanobu Nimiya, Tokyo (JP); Yoshihiro Konno, Tokyo (JP); Yuji Shindo, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 18/678,795

(22) Filed: May 30, 2024

(65) Prior Publication Data

US 2024/0403248 A1 Dec. 5, 2024

(30) Foreign Application Priority Data

Jun. 5, 2023 (JP) ................................. 2023-092157

(51) Int. Cl.
*G06F 13/28* (2006.01)

(52) U.S. Cl.
CPC .................................... *G06F 13/28* (2013.01)

(58) Field of Classification Search
None
See application file for complete search history.

(56) References Cited

U.S. PATENT DOCUMENTS 6,449,709 B1 * 9/2002 Gates ...................... G06F 9/325
712/225
6,701,395 B1 * 3/2004 Byrne ....................... G06F 3/05
710/28
8,537,242 B2 * 9/2013 Suska .................... H04N 23/72
348/222.1
8,970,410 B2 3/2015 Kawakami et al.
9,026,697 B2 * 5/2015 Yonemoto ................. G06F 5/10
710/53
10,476,656 B2 * 11/2019 Lee ...................... H04L 47/6245
10,606,784 B1 * 3/2020 Jreij .................... G06F 13/4282
10,872,049 B2 * 12/2020 Kessler .............. G06F 13/4282
11,100,963 B1 * 8/2021 Wu ............................. G06F 5/06
11,334,291 B2 * 5/2022 Frisson .................... G11C 7/22
2005/0018604 A1 * 1/2005 Dropps ................. H04L 49/357
370/229
2005/0018606 A1 * 1/2005 Dropps ................. H04L 49/351
370/386
2011/0035522 A1 * 2/2011 Tan ........................ G06F 13/28
711/100
2011/0188391 A1 * 8/2011 Sella ................... H04W 74/085
370/252

(Continued)

FOREIGN PATENT DOCUMENTS

JP 2013-179568 A 9/2013

*Primary Examiner* — Henry Tsai
*Assistant Examiner* — Christopher A Bartels
(74) *Attorney, Agent, or Firm* — Rimon P.C.

(57) ABSTRACT

An A/D conversion control circuit includes a scan group control unit and a FIFO unit. The scan group control unit includes an input reception unit and an arbitration unit. The FIFO unit includes a plurality of pointer control units provided correspondingly to the plurality of FIFO memories, respectively. Each of the pointer control units clears or changes a position of a write pointer/read pointer of the corresponding FIFO memory at the timing of at least any of the start, interruption, and/or restart of the corresponding scan group according to the priority of the scan group.

4 Claims, 21 Drawing Sheets

(56)                    References Cited

U.S. PATENT DOCUMENTS

| | | | | |
|---|---|---|---|---|
| 2013/0201044 A1* | 8/2013 | Kawakami | ............ | H03M 1/122 |
| | | | | 341/155 |
| 2013/0321673 A1* | 12/2013 | Lim | .................... | H04N 17/002 |
| | | | | 348/241 |
| 2013/0322746 A1* | 12/2013 | Cote | .................... | G06T 3/4015 |
| | | | | 382/163 |
| 2013/0322753 A1* | 12/2013 | Lim | ......................... | G06T 5/70 |
| | | | | 382/167 |
| 2014/0019650 A1* | 1/2014 | Li | ............................. | G06F 5/06 |
| | | | | 710/53 |
| 2014/0201761 A1* | 7/2014 | Dalal | ................. | G06F 13/4022 |
| | | | | 718/108 |
| 2014/0359191 A1* | 12/2014 | Pedersen | ................ | G06F 13/28 |
| | | | | 710/308 |
| 2015/0296193 A1* | 10/2015 | Cote | .................... | G06T 3/4015 |
| | | | | 382/167 |
| 2016/0210252 A1* | 7/2016 | Kawakami | ............. | G06F 13/16 |
| 2021/0117246 A1* | 4/2021 | Lal | ......................... | G06F 9/3814 |
| 2023/0042226 A1* | 2/2023 | Itani | ........................ | G06F 13/28 |
| 2023/0231811 A1* | 7/2023 | Dalal | ................. | G06F 13/1605 |
| | | | | 710/308 |
| 2023/0259469 A1* | 8/2023 | Zheng | .................... | G06F 13/28 |
| | | | | 710/308 |
| 2024/0113986 A1* | 4/2024 | Koramutla | ............. | H04L 47/28 |

* cited by examiner

FIG. 5

PRIORITY ORDER

HIGH

| SCAN GROUP SG0 | | |
|---|---|---|
| CH0 | CH1 | CH2 |

| SCAN GROUP SG1 | | | |
|---|---|---|---|
| CH4 | CH5 | CH6 | CH7 |

| SCAN GROUP SG2 | | |
|---|---|---|
| CH10 | CH11 | CH12 |

LOW

FIG. 7A

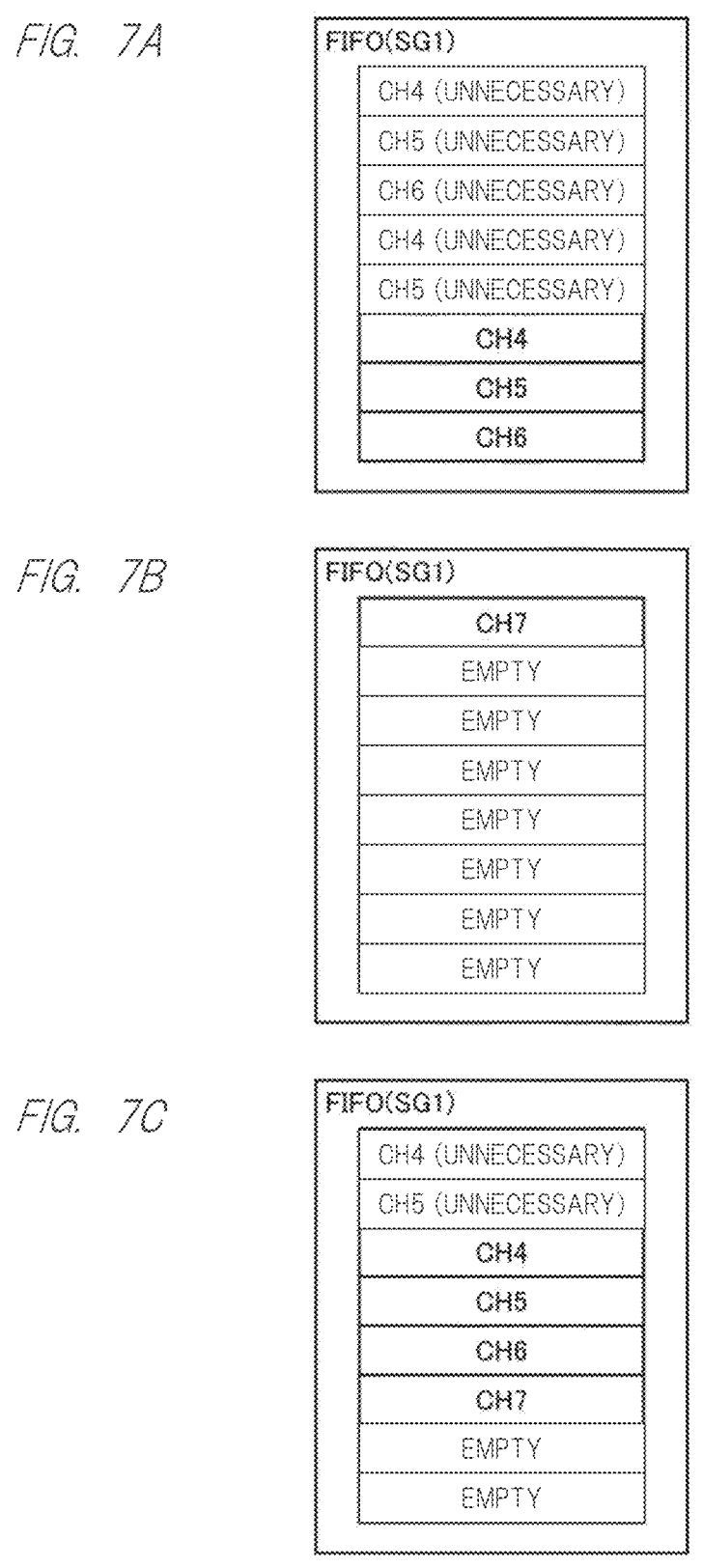

FIFO(SG1)

| |
|---|
| CH4 (UNNECESSARY) |
| CH5 (UNNECESSARY) |
| CH6 (UNNECESSARY) |
| CH4 (UNNECESSARY) |
| CH5 (UNNECESSARY) |
| CH4 |
| CH5 |
| CH6 |

FIG. 7B

FIFO(SG1)

| |
|---|
| CH7 |
| EMPTY |
| EMPTY |
| EMPTY |
| EMPTY |
| EMPTY |
| EMPTY |
| EMPTY |

FIG. 7C

FIFO(SG1)

| |
|---|
| CH4 (UNNECESSARY) |
| CH5 (UNNECESSARY) |
| CH4 |
| CH5 |
| CH6 |
| CH7 |
| EMPTY |
| EMPTY |

*FIG. 8*

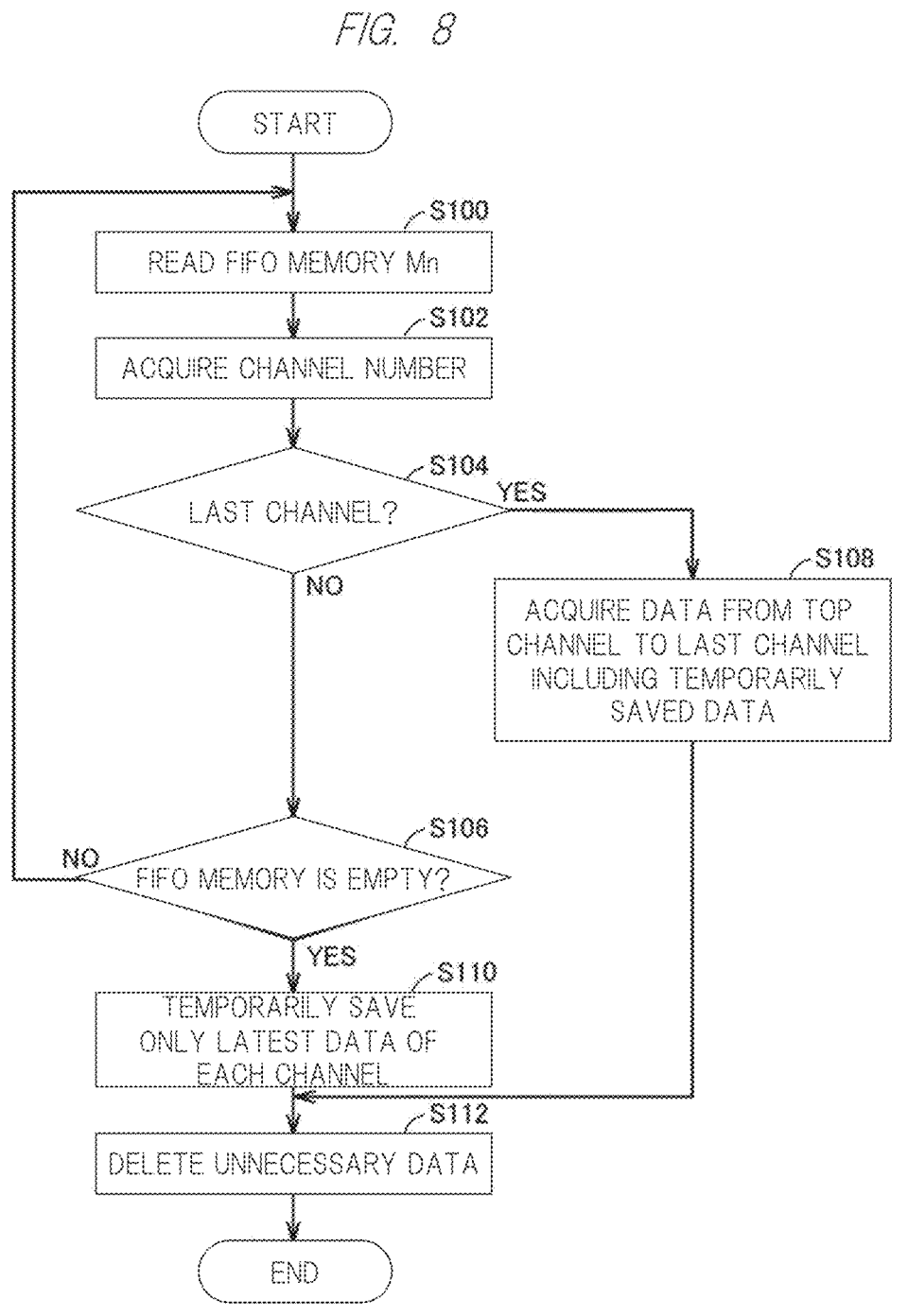

```
                    ┌─────────┐
                    │  START  │
                    └────┬────┘
                         │
    ┌────────────────────▼────────────────┐ S100
    │         READ FIFO MEMORY Mn          │
    └────────────────┬─────────────────────┘
                     │                      S102
    ┌────────────────▼─────────────────────┐
    │       ACQUIRE CHANNEL NUMBER          │
    └────────────────┬─────────────────────┘
                     │
                     ▼              S104        YES
            ◇ LAST CHANNEL? ◇ ──────────────────────┐
                     │                              │
                     │ NO                           ▼           S108
                     │                  ┌────────────────────────┐
                     │                  │  ACQUIRE DATA FROM TOP  │
                     │                  │ CHANNEL TO LAST CHANNEL │
                     │                  │  INCLUDING TEMPORARILY  │
                     │                  │       SAVED DATA        │
                     │                  └───────────┬────────────┘
                     ▼            S106              │
     NO    ◇ FIFO MEMORY IS EMPTY? ◇                │
                     │                              │
                     │ YES           S110           │
    ┌────────────────▼─────────────────────┐       │
    │      TEMPORARILY SAVE                 │       │
    │    ONLY LATEST DATA OF                │       │
    │       EACH CHANNEL                    │       │
    └────────────────┬─────────────────────┘       │
                     │◄──────────────────────────────┘
                     │                      S112
    ┌────────────────▼─────────────────────┐
    │        DELETE UNNECESSARY DATA        │
    └────────────────┬─────────────────────┘
                     │
                ┌────▼────┐
                │   END   │
                └─────────┘
```

*FIG. 15*

SGI IS TEMPORARILY INTERRUPTED FOR ALLOCATION OF HIGH PRIORITY SG0.

FIG. 20

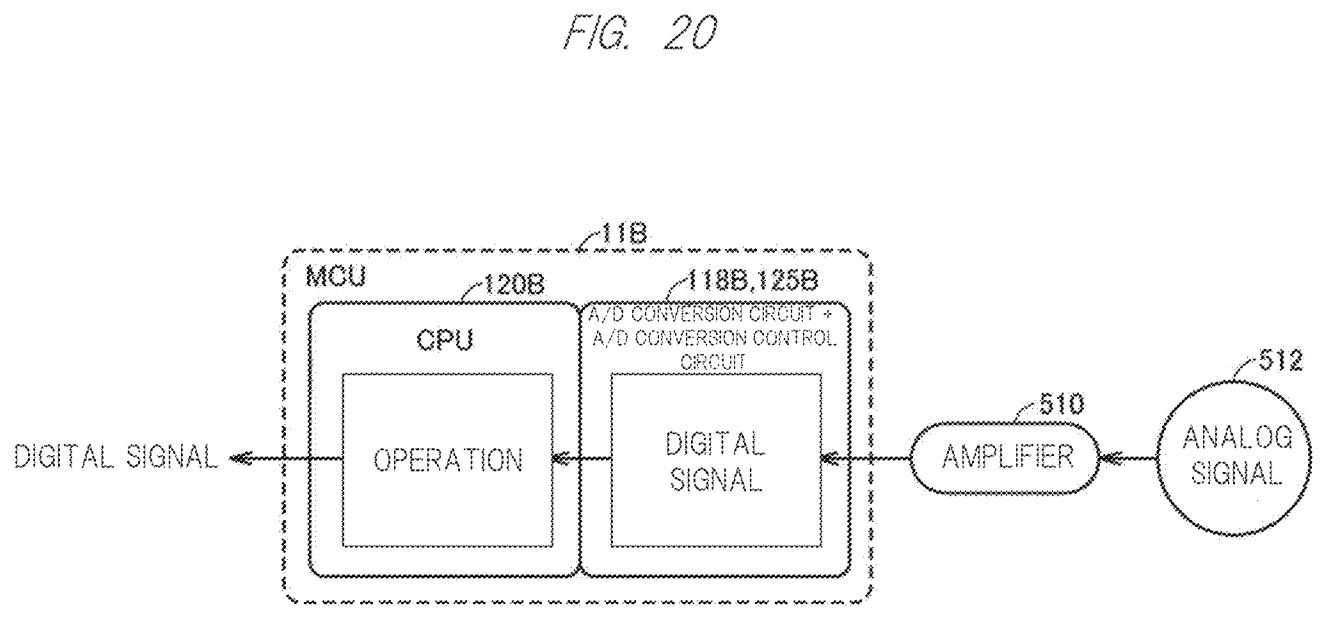

ANALOG SIGNAL

512

AMPLIFIER

510

MCU

11B

120B

CPU 118B,125B

A/D CONVERSION CIRCUIT +
A/D CONVERSION CONTROL
CIRCUIT

DIGITAL SIGNAL

OPERATION

DIGITAL SIGNAL

FIG. 21

A/D CONVERTER CONTROL CIRCUIT

CROSS-REFERENCE TO RELATED APPLICATIONS

The present application claims priority from Japanese Patent Application No. 2023-092157 filed on Jun. 5, 2023 the content of which is hereby incorporated by reference to this application.

BACKGROUND

The present disclosure relates to an A/D converter control circuit for converting analog signals into digital signals.

An example of a semiconductor integrated circuit device is an automobile engine controlling micro-control unit. As a generation of the automobile engine micro-control unit progresses, it is required to convert analog information from a large number of sensors at high speed.

There is a disclosed technique listed below.
[Patent Document 1] Japanese Unexamined Patent Application Publication No. 2013-179568

In this regard, the following method is disclosed: the analog information from the sensor is divided into scan groups, and the analog information is efficiently converted (see Patent Document 1).

SUMMARY

Meanwhile, in a case where an analog/digital conversion processing is performed for each scan group, if the certain analog/digital conversion processing is interrupted according to a priority, a conversion result of an interrupted channel remains. Since it takes time to delete remaining data and the like, a problem has arisen in performing the high-speed A/D conversion processing.

The present disclosure has been made to solve the above problem, and provides an A/D conversion control circuit capable of performing the high-speed A/D conversion processing.

Other problems and novel features will be apparent from description of the present specification and the accompanying drawings.

An A/D conversion control circuit of the present disclosure includes: a scan group control unit controlling a plurality of AD conversion channels with a plurality of scan groups having different priorities; and a FIFO unit provided corresponding to each of the plurality of scan groups, each having a plurality of FIFO memories that sequentially stores an output from the scan group control unit for each corresponding scan group. The scan group control unit includes: an input reception unit receiving an AD conversion channel of a corresponding scan group among the plurality of AD conversion channels according to an instruction, and outputting it to the corresponding FIFO memory; and an arbitration unit determining timing of conversion start, interruption, and restart in each of the plurality of scan groups. The FIFO unit further includes a plurality of pointer control units provided correspondingly to the plurality of FIFO memories, respectively. Each of the pointer control units clears or changes a position of a write pointer/read pointer of the corresponding FIFO memory at the timing of at least any of the start, interruption, and/or restart of the corresponding scan group according to the priority of the scan group.

The A/D conversion control circuit of the p disclosure includes the pointer control unit, and the pointer control unit can clear or change the position of the write pointer/read pointer of the corresponding FIFO memory at the timing of at least any of the start, interruption, and restart of the corresponding scan group according to the priority of the scan group, so that the high-speed A/D conversion processing can be performed.

BRIEF DESCRIPTION OF THE DRAWINGS

FIG. 5 is a diagram for explaining a scan group according to the first embodiment.

FIG. 7A is a diagram for explaining a FIFO memory M1 in the interruption processing of the high priority scan group according to the comparative example.

FIG. 7B is a diagram for explaining the FIFO memory M1 in the interruption processing of the high priority scan group according to the comparative example.

FIG. 7C is a diagram for explaining the FIFO memory M1 in the interruption processing of the high priority scan group according to the comparative example.

FIG. 8 is a diagram for explaining reading from the FIFO memory according to the comparative example.

FIG. 15 is a diagram for explaining a configuration of a pointer control unit PCT#n according to the second embodiment.

FIG. 20 is a diagram for explaining a second application example.

FIG. 21 is a diagram for explaining a third application example.

DETAILED DESCRIPTION

Figure 1:
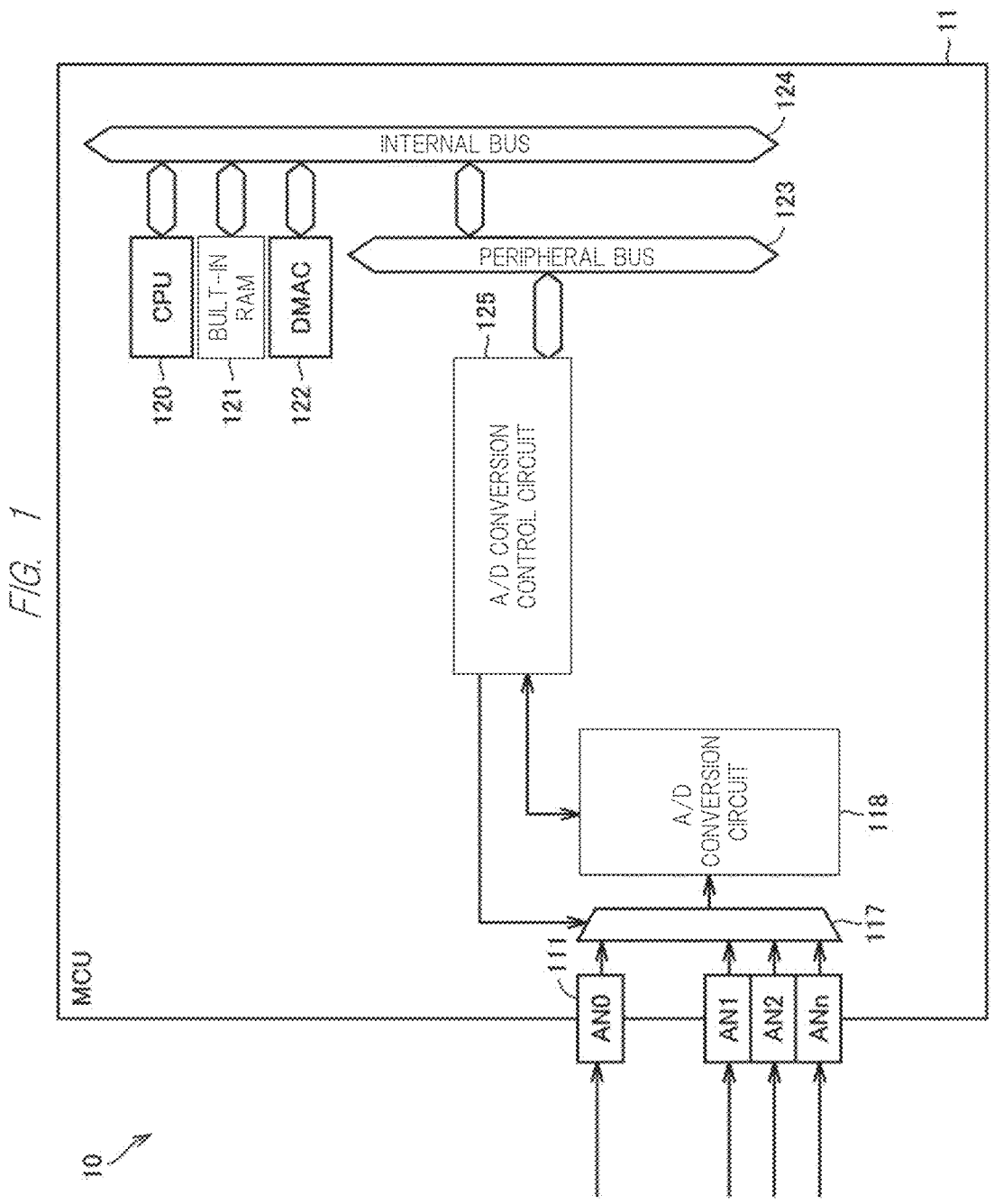
FIG. 1 is a diagram for explaining a data processing system 10 according to a first embodiment.

Embodiments will be described in detail with reference to the drawings. Note that the same reference numerals are attached to the same or corresponding parts in the figures, and a description thereof will not be repeated.

First Embodiment

FIG. 1 is a diagram for explaining a data processing system 10 according to a first embodiment.

Referring to FIG. 1, a data processing system 10 includes a semiconductor integrated circuit device 11 capable of processing analog signals. A micro-control unit (MCU) 11, which is an example of a semiconductor integrated circuit device, will be described.

The MCU 11 includes a plurality of analog ports 111 (AN0 to ANn) and an A/D conversion circuit 118 that performs A/D conversion processings to convert the analog signals taken in via the analog ports into digital signals. The MCU 11 also includes an A/D conversion control circuit 125 that controls an operation of the A/D conversion circuit, and a selector 117 that selects analog signals from the plurality of analog ports 111 according to instructions from the A/D conversion control circuit 125.

Additionally, the MCU 11 includes a CPU (central processing unit) 120, a built-in RAM (random access memory) 121, and a DMAC (direct memory access controller) 122. The CPU 120, built-in RAM 121, and DMAC 122 are coupled via an internal bus 124 so that they can mutually exchange signals. A peripheral bus 123 is coupled to the internal bus 124. The A/D conversion control circuit 125 is coupled to this peripheral bus 123.

The CPU 120 controls the overall operation of the MCU 11 according to a preset program. The built-in RAM 121 is used as a work area and the like for arithmetic processings by the CPU 120. The DMAC 122 controls data transfer directly without going through the CPU 120. The selector 117 selects and outputs the analog signals taken in via the respective analog ports 111 (AN0 to ANn).

The A/D conversion circuit 118 converts the analog signal selected by the selector 117 into a digital signal.

The A/D conversion control circuit 125 controls selection operations of the selector 117 and A/D conversion operations of the A/D conversion circuit 118.

Figure 2:
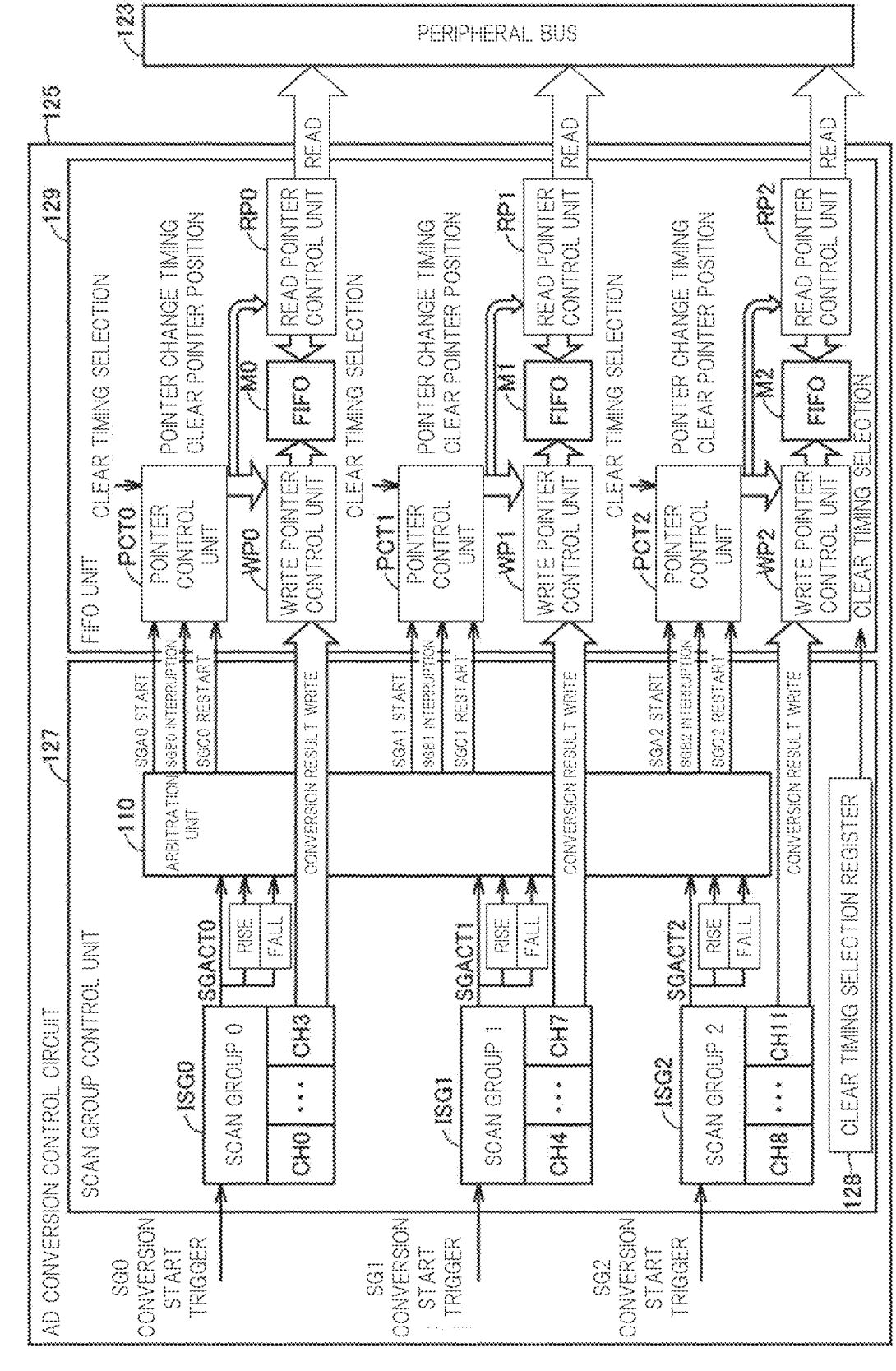
FIG. 2 is a diagram for explaining a configuration of an A/D conversion control circuit 125 according to the first embodiment.

FIG. 2 is a diagram for explaining a configuration of the A/D conversion control circuit 125 according to the first embodiment.

Referring to FIG. 2, the A/D conversion control circuit 125 includes a scan group control unit 127 and a FIFO unit 129.

The scan group control unit 127 controls multiple AD conversion channels by using multiple scan groups with different priorities.

The FIFO unit 129 is provided correspondingly to a plurality of scan groups SG0 to SG2 (also collectively referred to as scan groups SG), and each has multiple FIFO memory M0 to M2 (also collectively referred to as FIFO memory M) sequentially storing outputs from the scan group control unit 127 for each corresponding scan group SG.

The scan group control unit 127 includes: an input reception units ISG0 to ISG2 (also referred to as an input reception unit ISG) that receives the AD conversion channel of the corresponding scan group SG from among the plurality of AD conversion channels according to instructions and that outputs it to the corresponding FIFO memory M; and an arbitration unit 110 that determines conversion start, interruption, and restart timing for each of the plurality of scan groups.

The input reception unit ISG receives the AD conversion channel of the corresponding scan group SG, outputs the conversion result to the corresponding FIFO memory M of the FIFO unit 129, and also receives input of various control signals.

Specifically, the input reception unit ISG0 receives a conversion start trigger signal of the scan group SG0 in response to the scan group SG0 from the CPU 120. The input reception unit ISG0 outputs a control signal SGACT0 to the arbitration unit 110 according to an input of the conversion start trigger signal of the scan group SG0 in response to the scan group SG0. In addition, the input reception unit ISG0 outputs information on a rise and a fall of the control signal SGACT0 to the arbitration unit 110. The control signal SGACT0 is set to "1" for the scan group SG0 from the beginning until the final AD conversion channel is received. In other cases, the control signal SGACT0 is 0.

Note that as one example in this embodiment, a case in which the conversion start trigger signal is outputted from the CPU 120 will be described, but the present invention is not limited to this, and the conversion start trigger signal may be inputted from an outside together with the analog signal inputted to the analog port 111 (AN0 to ANn).

Similarly, the input reception unit ISG1 receives a conversion start trigger signal for the scan group SG1 from the CPU 120 in response to the scan group SG1. The input reception unit ISG1 outputs the control signal SGACT1 to the arbitration unit 110 according to the input of the conversion start trigger signal of the scan group SG1 in response to the scan group SG1. In addition, the input reception unit ISG1 outputs information on the rise and the fall of the control signal SGACT1 to the arbitration unit 110. The control signal SGACT1 is set to "1" for the scan group SG1 from the beginning until the final AD conversion channel is received. In other cases, the control signal SGACT1 is 0.

Similarly, the input reception unit ISG2 receives the conversion start trigger signal for the scan group SG2 in response to the scan group SG2 from the CPU 120. The input reception unit ISG2 outputs the control signal SGACT2 to the arbitration unit 110 according to the input of the conversion start trigger signal of the scan group SG2 in response to the scan group SG2. In addition, the input reception unit ISG2 outputs information on the rise and the fall of the control signal SGACT2 to the arbitration unit 110. The control signal SGACT2 is set to "1" for the scan group SG2 from the beginning until the final AD conversion channel is received. In other cases, the control signal SGACT2 is 0.

The arbitration unit 110 determines timing of the conversion start, interruption, and restart of the scan groups SG0 to SG2 based on the control signals SGACT0 to SGACT2 and on the information on the rises and falls of the control signals SGACT0 to SGACT2, and outputs the determination signals SGA0 to SGA2, SGB0 to SGB2, and SGC0 to SGC2, respectively.

The FIFO unit 129 includes write pointer control units WP0 to WP2 (also collectively referred to as write pointer control unit WP) that control write to FIFO memories M0 to M2 provided correspondingly to the FIFO memories M0 to M2, respectively. The FIFO unit 129 includes read pointer control units RP0 to RP2 (also collectively referred to as read pointer control unit RP) that control read from the FIFO memories M0 to M2 provided correspondingly to the FIFO memories M0 to M2, respectively. The FIFO unit 129 is provided correspondingly to the FIFO memories M0 to M2, respectively, and includes pointer control units PCT0 to PCT2 (also referred to as pointer control unit PCT) that control write pointer control units WP0 to WP2 and read pointer control units RP0 to RP2.

The pointer control unit PCT0 outputs a clear pointer position command signal and a pointer change timing signal to a write pointer control unit WP0 and a read pointer control unit RP0 based on an input of determination signals SGA0, SGB0, SGC0 and a clear timing selection signal from the arbitration unit 110.

The pointer control unit PCT1 outputs the clear pointer position command signal and the pointer change timing signal to the write pointer control unit WP1 and the read pointer control unit RP1 based on an input of determination signals SGA1, SGB1, SGC1 and the clear timing selection signal from arbitration unit 110.

The Pointer control unit PCT2 outputs the clear pointer position command signal and the pointer change timing signal to a write pointer control unit WP2 and a read pointer control unit RP2 based on an input of determination signals SGA2, SGB2, SGC2 and the clear timing selection signal from arbitration unit 110.

Figure 3:
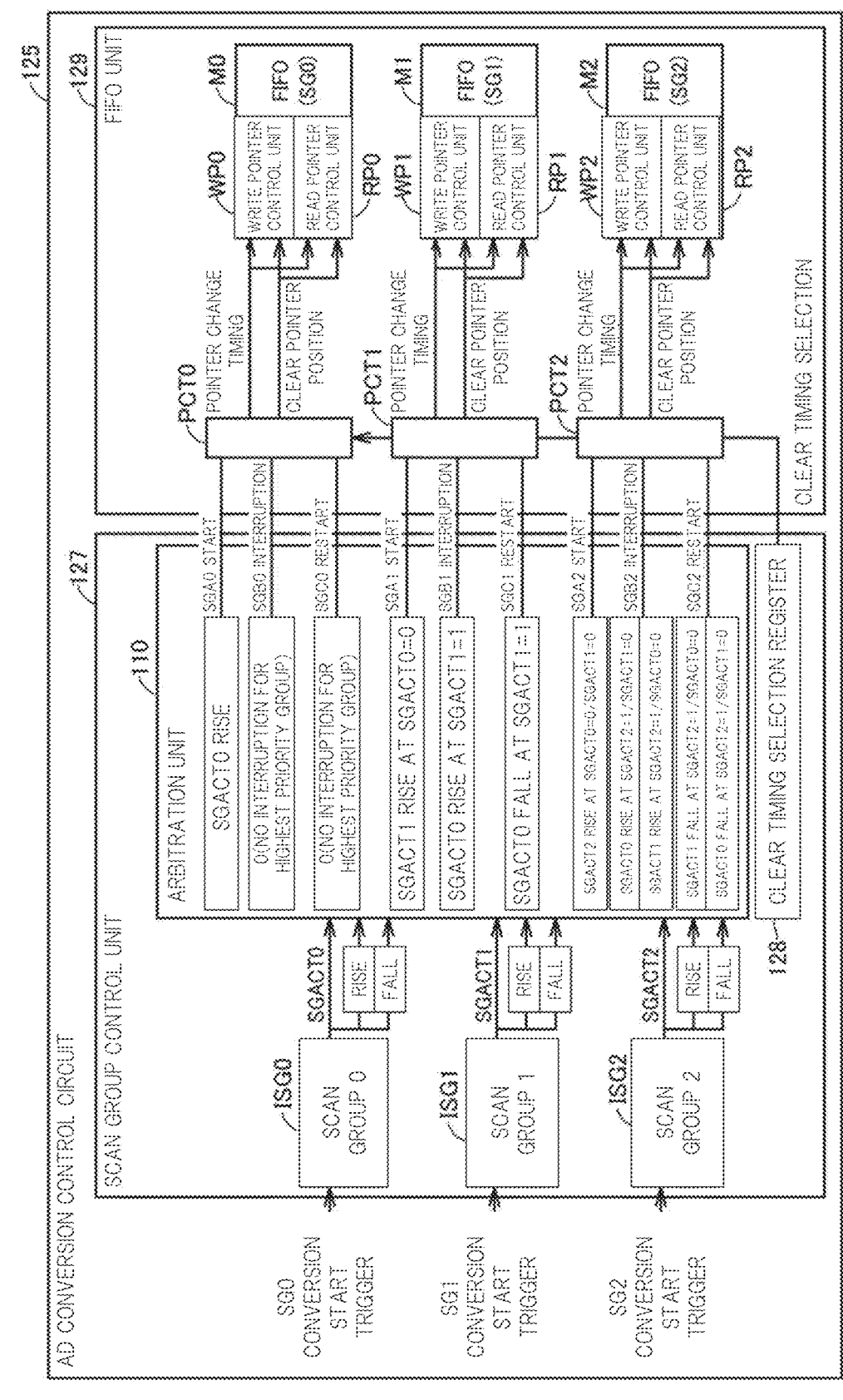
FIG. 3 is a diagram for explaining a determination signal from an arbitration unit 110 according to the first embodiment.

FIG. 3 is a diagram for explaining the determination signal from the arbitration unit 110 according to the first embodiment.

Referring to FIG. 3, in this example, the following case will be described: the scan group SG0 has the highest priority, the scan group SG1 has the next highest priority, and the scan group SG2 has the lowest priority.

The arbitration unit 110 outputs the determination signal SGA0 indicating timing of starting conversion of the scan group SG0 to the pointer control unit PCT0 of the FIFO unit 129 according to a rise of the control signal SGACT0. In this example, the scan group SG0 has the high priority, so that it is not interrupted or restarted. Therefore, the determination signals SGB0 and SGC0 are not outputted.

Next, in the arbitration unit 110, the control signal SGACT0 is 0, and the determination signal SGA1 indicating the timing of starting the conversion of the scan group SG1 is outputted to the pointer control unit PCT1 of the FIFO unit 129.

Furthermore, in the arbitration unit 110, the control signal SGACT1 is 1, and the determination signal SGB1 indicating timing of interrupting the scan group SG1 is outputted to the pointer control unit PCT1 of the FIFO unit 129 according to the rise of the control signal SGACT0 1.

Further, in the arbitration unit 110, the determination signal SGC1 indicating timing of restarting the scan group SG1 is outputted to the pointer control unit PCT1 of the FIFO unit 129 according to the fall of the control signal SGACT0.

Next, in the arbitration unit 110, the control signals SGACT0 and SGACT1 are 0, and the determination signal SGA2 indicating the timing of starting the conversion of the scan group SG2 according to the rise of the control signal SGACT2 is outputted to the pointer control unit PCT1 of the FIFO unit 129.

Furthermore, in the arbitration unit 110, the control signal SGACT2 is 1 and the control signal SGACT1 is 0, and the determination signal SGB2 indicating the timing of interrupting the scan group SG2 according to the rise of the control signal SGACT0 is outputted to the pointer control unit PCT2 of the FIFO unit 129.

Furthermore, in the arbitration unit 110, the control signal SGACT2 is 1 and the control signal SGACT0 is 0, and the determination signal SGB2 indicating the timing of interrupting the scan group SG2 according to the rise of the control signal SGACT1 is outputted to the pointer control unit PCT2 of the FIFO unit 129.

Furthermore, in the arbitration unit 110, the control signal SGACT2 is 1 and the control signal SGACT0 is 0, and the determination signal SGC2 indicating the timing of restarting the scan group SG2 according to the fall of the control signal SGACT1 is outputted to the pointer control unit of the FIFO unit 129.

Furthermore, in the arbitration unit 110, the control signal SGACT2 is 1 and the control signal SGACT1 is 0, and the determination signal SGC2 indicating the timing of restarting the scan group SG2 according to the fall of the control signal SGACT0 is outputted to the pointer control unit of the FIFO unit 129.

Figure 4:
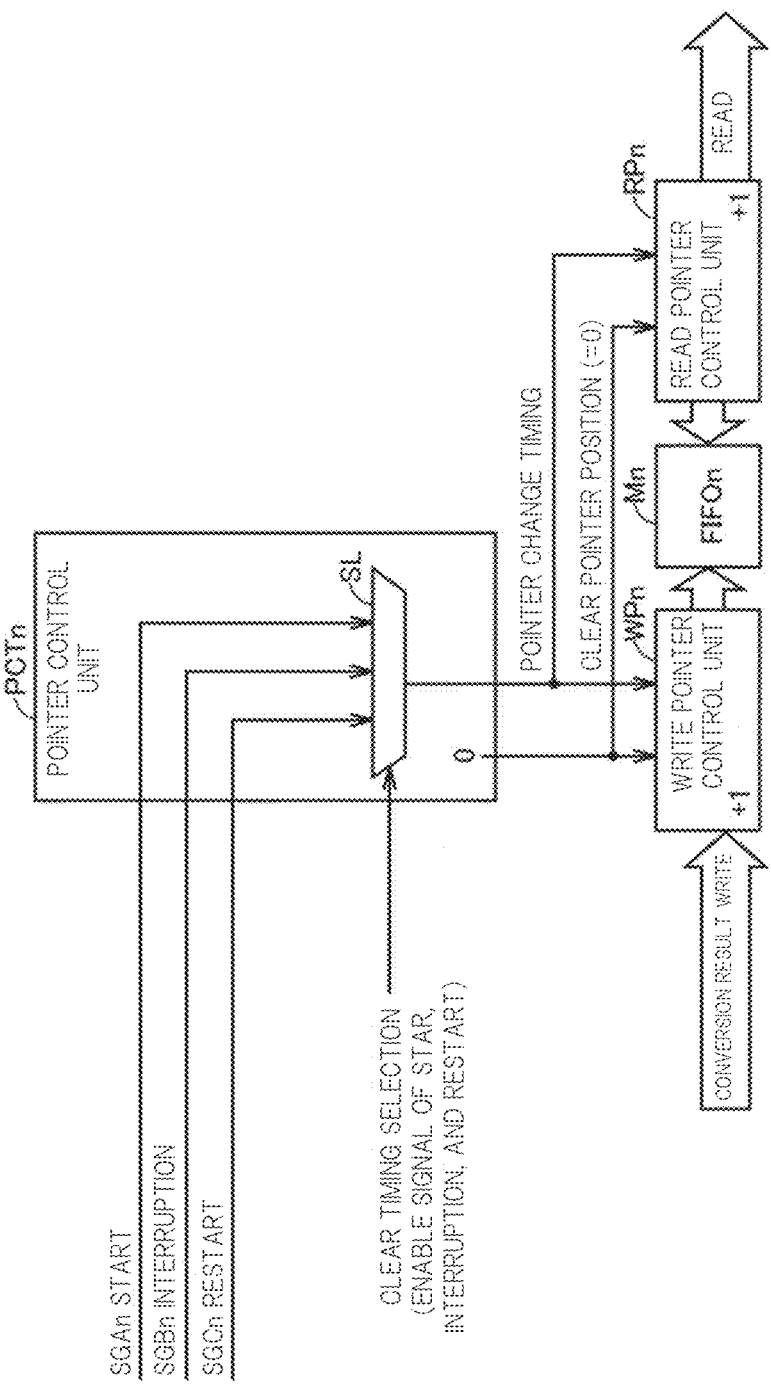
FIG. 4 is a diagram for explaining a configuration of a pointer control unit PCTn according to the first embodiment.

FIG. 4 is a diagram for explaining a configuration of the pointer control unit PCTn according to the first embodiment.

Referring to FIG. 4, the pointer control unit PCTn includes a selector SL that receives inputs of the determination signals SGAn, SGBn, and SGCn and selects them according to the clear timing selection signal. "n" can take any value. In this example, "n" ranges from 0 to 2.

The clear timing selection signal is outputted based on information stored in the clear timing selection register 128. As one example, the clear timing selection register 128 is configured by three bits corresponding to start, interruption, and restart of the clear timing. Note that, as one example, a case in which the information is configured by three bits has been described, but the present invention is not limited to this and any number of bits may be used as long as the information can be used to indicate each state.

By setting any bit of the clear timing selection register 128, the clear timing selection signal ("1") is outputted to the selector SL.

For example, when the bit corresponding to the start of the clear timing selection register 128 is set to "1", the selector SL outputs the determination signal SGAn as a pointer change timing signal to the write pointer control unit WPn and the read pointer control unit RPn.

In this case, at the timing of starting the conversion of the scan group SGn, the write pointer control unit WPn and the read pointer control unit RPn set the pointer at the clear pointer position ("0").

Similarly, for example, when a bit corresponding to the interruption of the clear timing selection register 128 is set to "1", the selector SL outputs, as a pointer change timing signal, the determination signal SGBn to the write pointer control unit WPn and the read pointer control unit RPn.

In this case, at the timing of interrupting the scan group SGn, the write pointer control unit WPn and the read pointer control unit RPn set the pointer to the clear pointer position ("0").

Similarly, for example, when a bit corresponding to restart of the clear timing selection register 128 is set to "1", the selector SL uses, as a pointer change timing signal, the determination signal SGCn to the write pointer control unit WPn and the read pointer control unit RPn.

In this case, at the timing of restarting the scan group SGn, the write pointer control unit WPn and the read pointer control unit RPn set the pointer to the clear pointer position ("0").

Figure 5:
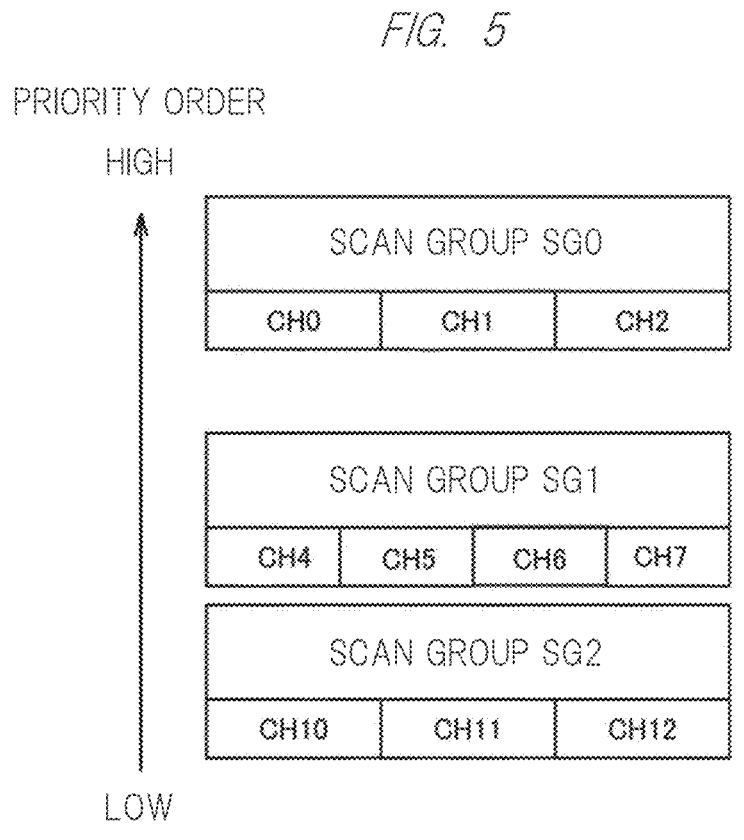

FIG. 5 is a diagram for explaining the scan groups according to the first embodiment.

Referring to FIG. 5, in this example, the scan groups SG0 to SG2 are provided. In the can group SG0, AD conversion channels CH0 to CH2 are allocated. In the scan group SG1, AD conversion channels CH4 to CH7 are allocated. In the scan group SG2, AD conversion channels CH10 to CH12 are allocated.

AD conversion is performed for each scan group SG. The scan group SG0 has the highest priority, the scan group SG1 has the next highest priority, and the scan group SG2 has the lowest priority.

Therefore, the AD conversion of the scan group SG0 may be interrupted during the AD conversion of the scan group SG1.

Comparative Example

In a comparative example, a configuration in which the pointer control unit PCT is not provided will be described. That is, in the comparative example, the following case will be described: timing of clearing the FIFO memory is when the memory is in a full state and when reading is performed.

Figure 6:
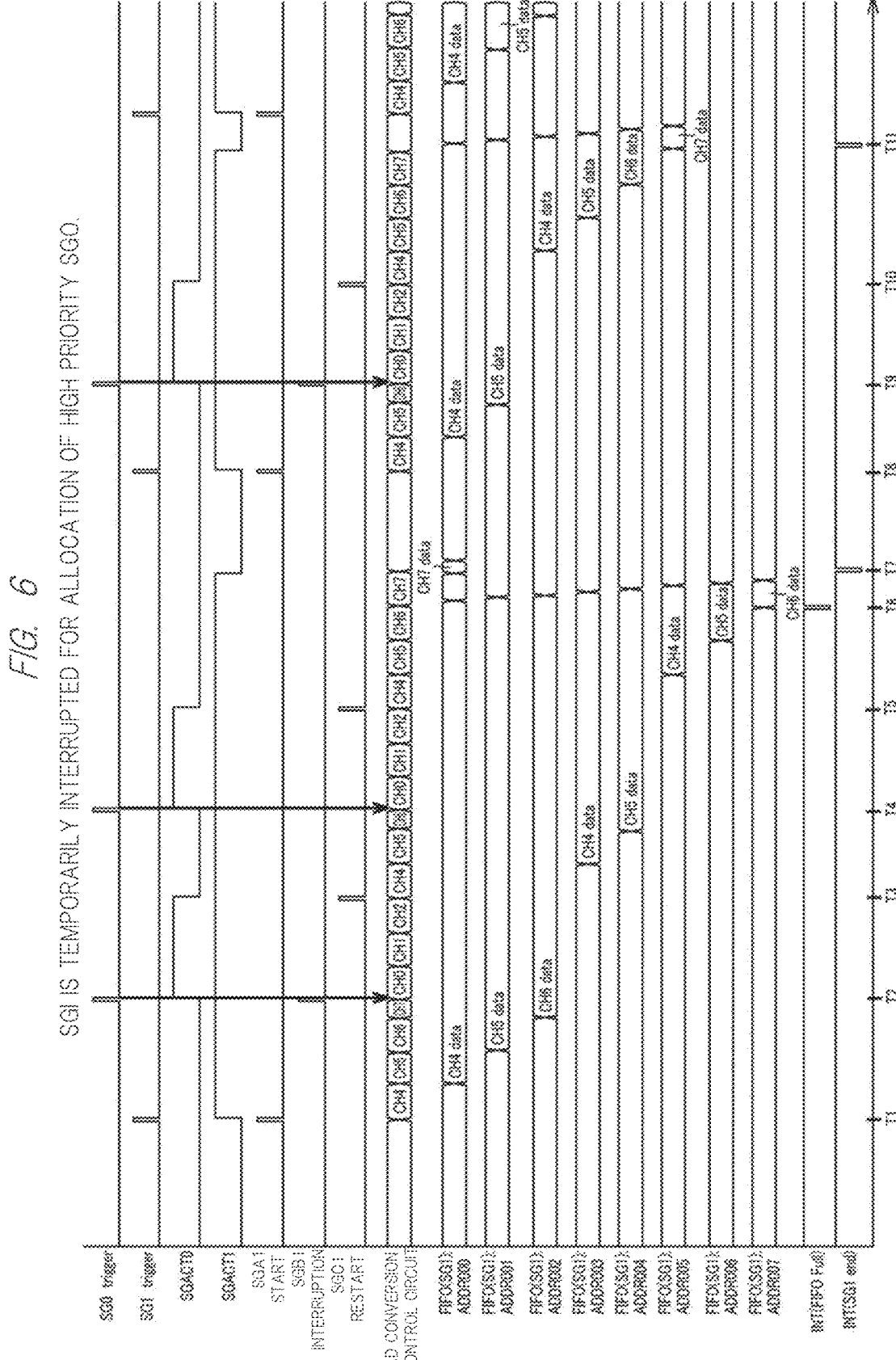
FIG. 6 is a diagram for explaining an interruption processing of a high priority scan group according to a comparative example.

FIG. 6 is a diagram for explaining an interruption processing of a high priority scan group according to a comparative example.

In this example, the scan groups SG0 and SG1 will be explained with reference to FIG. 6.

At time T1, a conversion start trigger for scan group SG1 is inputted, and an AD conversion channel for scan group SG1 is sequentially inputted to an input reception unit ISG1. The input reception unit ISG1 sets the control signal SGACT1 to 1.

In this example, the following case is shown: the AD conversion channel CH6 is sequentially inputted from the AD conversion channel CH4 to the input reception unit ISG1 and is sequentially stored in a FIFO memory M1.

Then, at time T2 in the middle of timing at which the input reception unit ISG1 receives the AD conversion channel CH7, the conversion start trigger for scan group SG0 is inputted. Consequently, the input reception unit ISG0 sets the control signal SGACT0 to 1. Then, the AD conversion of the scan group SG1 is interrupted. Then, the input reception unit ISG0 receives the AD conversion channels CH0 to CH2 of the scan group SG0 and sequentially stores them in the FIFO memory M0.

Next, at time T3, the input reception unit ISG0 receives conversion completion of the final AD conversion channel CH2 of the scan group SG0. Consequently, the control signal SGACT0 is set to 0. Then, the AD conversion of the scan group SG1 is restarted.

In this example, the following case is shown: the AD conversion channel CH5 is sequentially inputted from the AD conversion channel CH4 to the input reception unit ISG1 and is sequentially stored in the FIFO memory M1.

Then, at time T4 in the middle of timing at which the input reception unit ISG1 receives the AD conversion channel CH6, the conversion start trigger of the scan group SG0 is inputted. Consequently, the input reception unit ISG0 sets the control signal SGACT0 to 1. Then, the AD conversion of the scan group SG1 is interrupted. Then, the input reception unit ISG0 receives the AD conversion channels CH0 to CH2 of the scan group SG0 and sequentially stores them in the FIFO memory M0.

Next, at time T5, the input reception unit ISG0 accepts the conversion completion of the final AD conversion channel CH2 of the scan group SG0. Consequently, the control signal SGACT0 is set to 0. Then, the AD conversion of the scan group SG1 is restarted.

In this example, the following case is shown: the AD conversion channel CH7 is sequentially inputted from the AD conversion channel CH4 to the input reception unit ISG1 and is sequentially stored in the FIFO memory M1.

Then, at time T6, a case in which the FIFO memory M1 is in a full state is shown. In this case, it is necessary to temporarily save data in the FIFO memory M1 and secure a storage region. Then, at time T7, the final AD conversion channel CH7 is stored in the FIFO memory M1, and the AD conversion of the scan group SG1 is completed. Consequently, the control signal SGACT1 is set to 0.

Next, at time T8, the conversion start trigger of the scan group SG1 is inputted, and the AD conversion channel of the scan group SG1 is sequentially inputted to the input reception unit ISG1. The input reception unit ISG1 sets the control signal SGACT1 to 1.

In this example, the following case is shown: the AD conversion channel CH5 is sequentially inputted from the AD conversion channel CH4 to the input reception unit ISG1 and is sequentially stored in the FIFO memory M1.

Then, at time T9 in the middle of timing at which the input reception unit ISG1 receives the AD conversion channel CH6, the conversion start trigger of the scan group SG0 is inputted. Consequently, the input reception unit ISG0 sets the control signal SGACT0 to 1. Then, the AD conversion of the scan group SG1 is interrupted. Then, the input reception unit ISG0 receives the AD conversion channels CH0 to CH2 of the scan group SG0 and sequentially stores them in the FIFO memory M0.

Next, at time T10, the input reception unit ISG0 accepts the conversion completion of the final AD conversion channel CH2 of the scan group SG0. Consequently, the control signal SGACT0 is set to 0. Then, the AD conversion of the scan group SG1 is restarted.

In this example, the following case is shown: the AD conversion channel CH7 is sequentially inputted from the AD conversion channel CH4 to the input reception unit ISG1 and is sequentially stored in the FIFO memory M1.

Then, at time T1*l*, the final AD conversion channel CH7 is stored in the FIFO memory M1, and the AD conversion of the scan group SG1 is completed. Consequently, the control signal SGACT1 is set to 0.

FIG. 7 is a diagram for explaining the FIFO memory M1 in a high priority scan group interruption processing according to the comparative example.

Referring to FIG. 7A, in this example, it is assumed that the FIFO memory M1 is provided, as one example, with an eight-stage storage region.

A state in which the FIFO memory M1 is filled with data remaining due to the interruption processing at time T6 is shown. In this case, the AD conversion channels CH4 to CH6 stored first and the AD conversion channels CH4 and CH5 stored next, in order from the top, are unnecessary data. Then, it is necessary to temporarily save the last stored AD conversion channels CH4 to CH6.

Referring to FIG. 7B, a case in which the AD conversion channel CH7 is stored after all data in the FIFO memory M1 is read is shown. This makes it possible to acquire a data set of a set of the AD conversion channels CH4 to CH7 of the scan group SG1.

Referring to FIG. 7C, the following case is shown: the data set of the set of AD conversion channels CH4 to CH7 of the scan group SG1 is acquired at time T11.

Even in this case, the first AD conversion channels CH4 and CH5 are unnecessary data due to the interruption processing.

FIG. 8 is a diagram for explaining the read from the FIFO memory according to the comparative example.

Referring to FIG. 8, a read processing of the FIFO memory Mn is performed (step S100).

Next, a read channel number is acquired (step S102).

Next, it is determined whether the last channel is to be read based on the acquired channel number (step S104).

In step S104, if it is determined that the last channel is to be read (YES in step S104), data from the first channel to the last channel, including the temporarily saved data, is acquired (step S108).

Then, the unnecessary data is deleted (step S112).

Then, the processing ends (end).

Meanwhile, if it is determined in step S104 that the last channel is not read (NO in step S104), it is determined whether the FIFO memory Mn is empty (step S106).

If it is determined in step S106 that the FIFO memory Mn is not empty (NO in step S106), the processing returns to step S100 and the above processing is repeated.

In step S106, if it is determined that the FIFO memory Mn is empty, only the latest data of each channel is temporarily saved (step S110).

Next, the unnecessary data is deleted (step S112).

Then, the processing ends (end).

Figure 9:
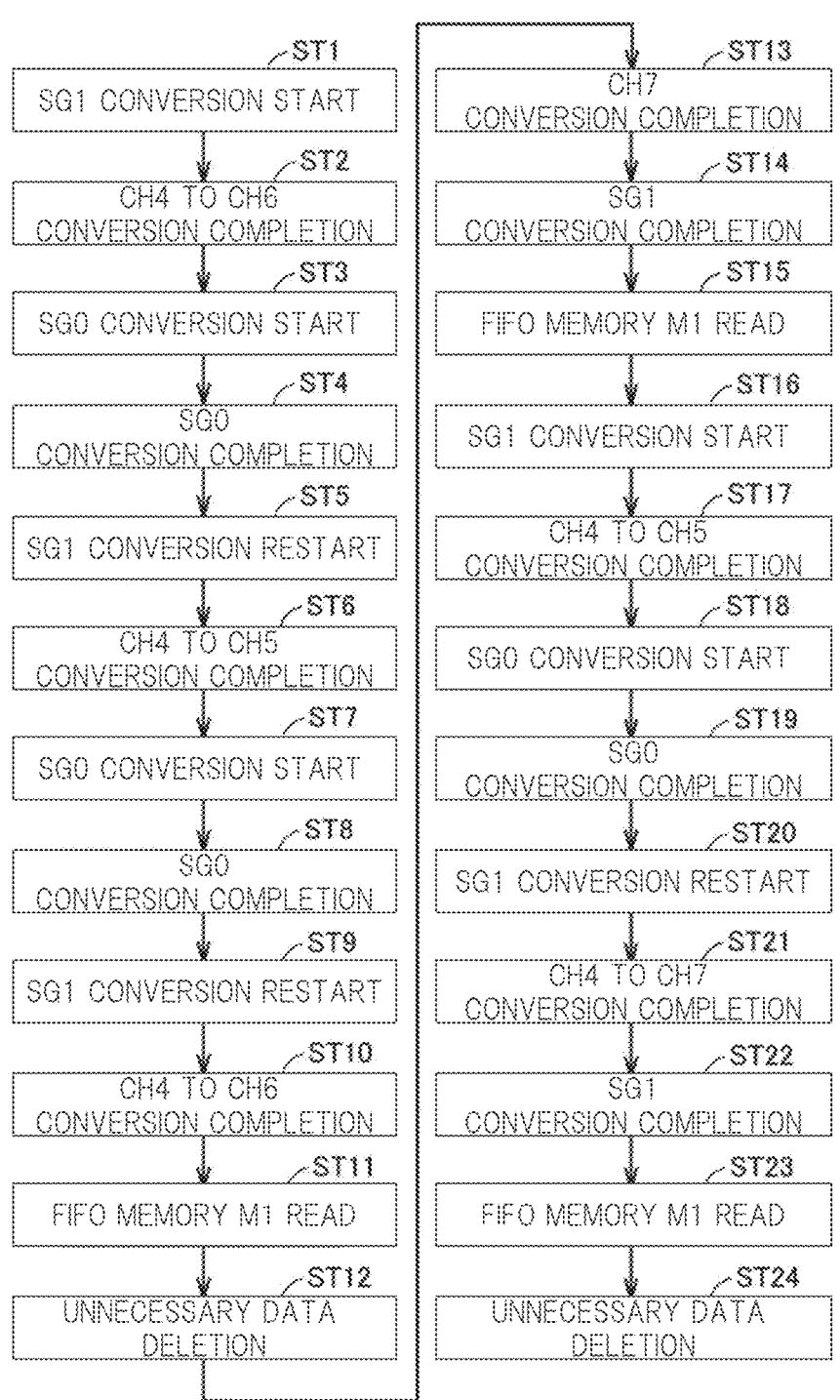
FIG. 9 is a flow diagram for explaining a flow of an AD conversion processing according to the comparative example.

FIG. 9 is a flow diagram for explaining a flow of the AD conversion processing according to the comparative example.

Referring to FIG. 9, the AD conversion of the scan group SG1 is started (step ST1). Next, the AD conversion of the AD conversion channels CH4 to CH6 is completed (step ST2). The number of pieces of data in the FIFO memory M1 is three. Next, the AD conversion of the scan group SG0 is started (step ST3). Consequently, the AD conversion of the scan group SG1 is interrupted. Next, the AD conversion of the scan group SG0 is completed (step ST4). Next, the AD conversion of the scan group SG1 is restarted (step ST5). Next, the AD conversion of the AD conversion channels CH4 and CH5 is completed (step ST6). The number of pieces of data in the FIFO memory M1 is five.

Next, the AD conversion of the scan group SG0 is started (step ST7). Consequently, the AD conversion of the scan group SG1 is interrupted. Next, the AD conversion of the scan group SG0 is completed (step ST8). Next, the AD conversion of the scan group SG1 is restarted (step ST9). Next, the AD conversion of the AD conversion channels CH4 to CH6 is completed (step ST10). The number of pieces of data in the FIFO memory M1 is eight. This brings the FIFO memory M1 into a full state.

Next, the full state of the FIFO memory M1 is detected and the data in the FIFO memory M1 is read out (step ST11). Consequently, the number of pieces of data in the FIFO memory M1 becomes zero.

Next, the read unnecessary data is deleted (step ST12). Next, the AD conversion of the AD conversion channel CH7 is completed (step ST13). Next, the AD conversion of the scan group SG1 is completed (step ST14). Next, the end of AD conversion of the scan group SG1 is detected, and the data in the FIFO memory M1 is read out (step ST15). Consequently, the number of pieces of data in the FIFO memory M1 becomes zero.

Next, the AD conversion of the scan group SG1 is started (step ST16). Next, the AD conversion of the AD conversion channels CH4 and CH5 is completed (step ST17). The number of pieces of data in the FIFO memory M1 is two. Next, the AD conversion of the scan group SG0 is started (step ST18). Consequently, the AD conversion of the scan group SG1 is interrupted. Next, the AD conversion of the scan group SG0 is completed (step ST19).

Next, the AD conversion of the scan group SG1 is restarted (step ST20). Next, the AD conversion of the AD conversion channels CH4 to CH7 is completed (step ST21). The number of pieces of data in the FIFO memory M1 is six. Next, the AD conversion of the scan group SG1 is completed (step ST22). Next, the end of the AD conversion of the scan group SG1 is detected, and the data in the FIFO memory M1 is read out (step ST23). Consequently, the number of pieces of data in the FIFO memory M1 becomes zero. Next, the read unnecessary data is deleted (step ST24).

When the AD conversion channels in the eight-stage FIFO memory M1 under a situation where the scan group SG1 is interrupted by the scan group SG0, a conversion result before the interruption of the scan group SG1 remains in the FIFO memory M1. By the conversion completion of the scan group SG0, the scan group SG1 restarts the conversion from the top channel, so that if the interruption of the scan group SG0 continuously occurs, the state of the FIFO memory becomes full. Consequently, data read by software and a deletion processing of the unnecessary data are required.

A problem has arisen in that this processing requires a high-speed A/D conversion processing.

Example

In an example, the following method will be described: the pointer control unit PCT clears the FIFO memory at the timing of at least one of the start, interruption, and restart of the scan group. As one example, a case in which "1" is set to the bit corresponding to the restart of the clear timing selection register 128 will be described. In this case, at the timing of restarting the scan group SG1, the write pointer control unit WP1 and the read pointer control unit RP1 set the pointer at the clear pointer position ("0").

Figure 10:
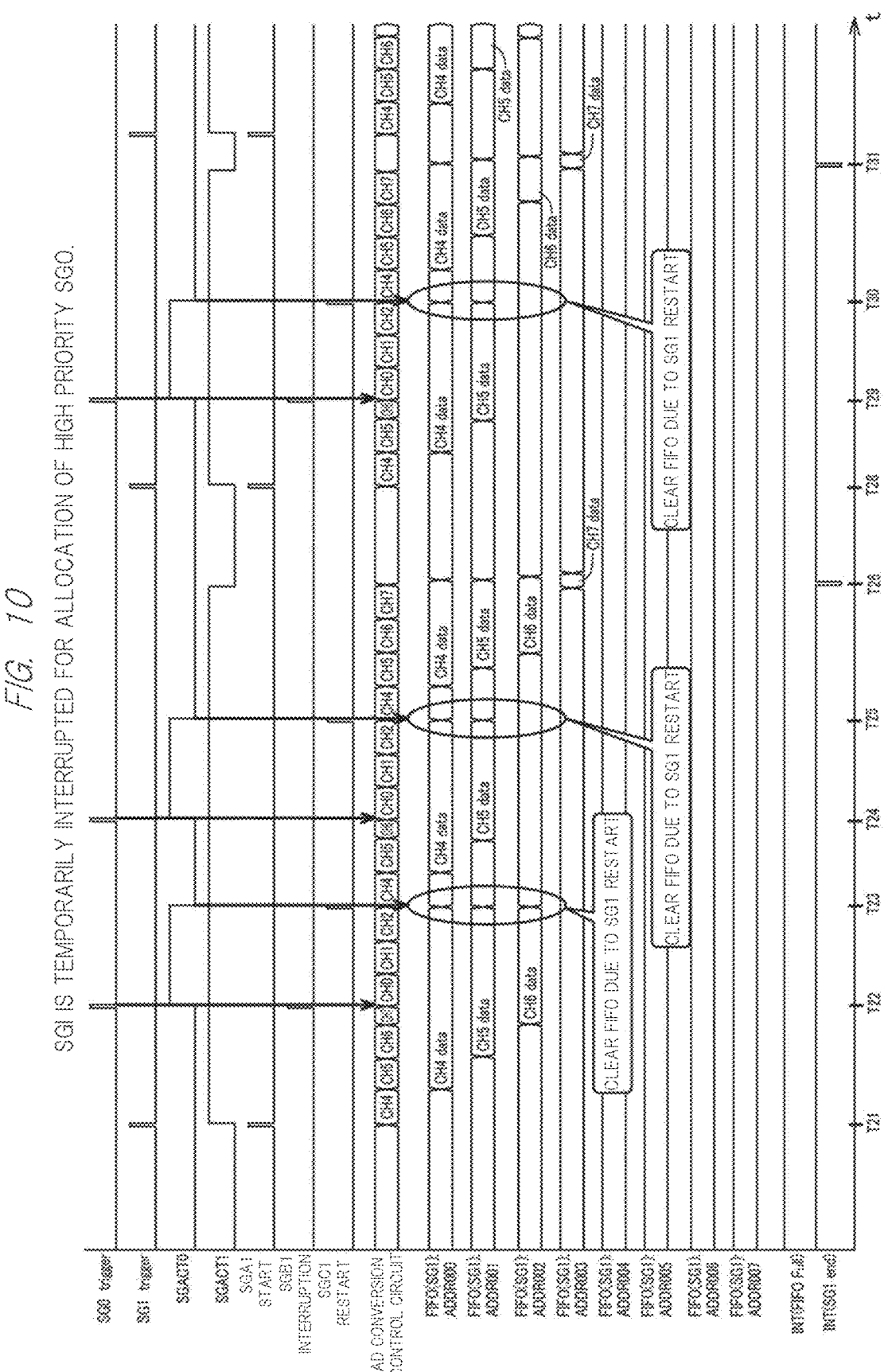
FIG. 10 is a diagram for explaining the interruption processing of the high priority scan group according to the first embodiment.

FIG. 10 is a diagram for explaining an interruption processing of a high priority scan group according to a first embodiment.

In this example, the scan groups SG0 and SG1 will be described with reference to FIG. 10.

At time T21, the conversion start trigger of the scan group SG1 is inputted, and the AD conversion channel of the scan group SG1 is sequentially inputted to the input reception unit ISG1. The input reception unit ISG1 sets the control signal SGACT1 to 1.

In this example, the following case is shown: the AD conversion channel CH6 is sequentially inputted from the AD conversion channel CH4 to the input reception unit ISG1 and is sequentially stored in the FIFO memory M1.

Then, at time T22 in the middle of timing at which the input reception unit ISG1 receives the AD conversion channel CH7, the conversion start trigger of the scan group SG0 is inputted. Consequently, the input reception unit ISG0 sets the control signal SGACT0 to 1. Then, the AD conversion of the scan group SG1 is interrupted. Then, the input reception unit ISG0 receives the AD conversion channels CH0 to CH2 of the scan group SG0 and sequentially stores them in the FIFO memory M0.

Next, at time T23, the input reception unit ISG0 accepts the conversion completion of the final AD conversion channel CH2 of the scan group SG0. Consequently, the control signal SGACT0 is set to 0. Then, with the restart of the AD conversion of the scan group SG1, the determination signal SGC1 is set to "1". Accordingly, the write pointer control unit WP1 and the read pointer control unit RP1 set the pointer at the clear pointer position ("0").

In this example, the following case is shown: the AD conversion channel CH5 is sequentially inputted from the AD conversion channel CH4 to the input reception unit ISG1 and is sequentially stored in the FIFO memory M1.

Then, at time T24 in the middle of timing at which the input reception unit ISG1 receives the AD conversion channel CH6, the conversion start trigger of the scan group SG0 is inputted. Consequently, the input reception unit ISG0 sets the control signal SGACT0 to 1. Then, the AD conversion of the scan group SG1 is interrupted. Then, the input reception unit ISG0 receives the AD conversion channels CH0 to CH2 of the scan group SG0 and sequentially stores them in the FIFO memory M0.

Next, at time T25, the input reception unit ISG0 accepts the conversion completion of the final AD conversion channel CH2 of the scan group SG0. Consequently, the control signal SGACT0 is set to 0. Then, with the restart of the AD conversion of the scan group SG1, the determination signal SGC1 is set to "1". Accordingly, the write pointer control unit WP1 and the read pointer control unit RP1 set the pointer at the clear pointer position ("0").

In this example, the following case is shown: the AD conversion channel CH7 is sequentially inputted from the AD conversion channel CH4 to the input reception unit ISG1 and is sequentially stored in the FIFO memory M1.

Then, at time T26, the final AD conversion channel CH7 is stored in the FIFO memory M1, and the AD conversion of the scan group SG1 is completed. Consequently, the control signal SGACT1 is set to 0.

Next, at time T28, the conversion start trigger of the scan group SG1 is inputted, and the AD conversion channel of the scan group SG1 is sequentially inputted to the input reception unit ISG1. The input reception unit ISG1 sets the control signal SGACT1 to 1.

In this example, the following case is shown: the AD conversion channel CH5 is sequentially inputted from the AD conversion channel CH4 to the input reception unit ISG1 and is sequentially stored in the FIFO memory M1.

Then, at time T29 in the middle of timing at which the input reception unit ISG1 receives the AD conversion channel CH6, the conversion start trigger of the scan group SG0 is inputted. Consequently, the input reception unit ISG0 sets the control signal SGACT0 to 1. Then, the AD conversion of the scan group SG1 is interrupted. Then, the input reception unit ISG0 receives the AD conversion channels CH0 to CH2 of the scan group SG0 and sequentially stores them in the FIFO memory M0.

Next, at time T30, the input reception unit ISG0 accepts the conversion completion of the final AD conversion channel CH2 of the scan group SG0. Consequently, the control signal SGACT0 is set to 0. Then, with the restart of the AD conversion of the scan group SG1, the determination signal SGC1 is set to "1". Accordingly, the write pointer control unit WP1 and the read pointer control unit RP1 set the pointer at the clear pointer position ("0").

In this example, the following case is shown: the AD conversion channel CH7 is sequentially inputted from the AD conversion channel CH4 to the input reception unit ISG1 and is sequentially stored in the FIFO memory M1.

Then, at time T31, the final AD conversion channel CH7 is stored in the FIFO memory M1, and the AD conversion of the scan group SG1 is completed. Consequently, the control signal SGACT1 is set to 0.

FIG. 11 is a diagram for explaining the interruption processing of the FIFO memory M1 of the high priority scan group according to the first embodiment.

Figure 11A:
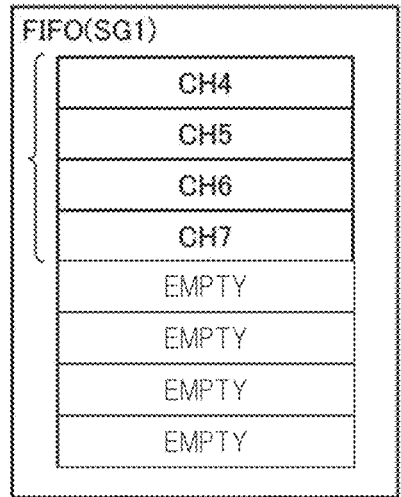
FIG. 11A is a diagram for explaining the FIFO memory M1 of the interruption processing of the high priority scan group according to the first embodiment.

Referring to FIG. 11A, in this example, it is assumed, as one example, that the FIFO memory M1 is provided with an eight-stage storage area.

A case in which the AD conversion channels CH4 to CH7 are stored at time T26 is shown. Until this state is reached, the FIFO memory M1 is in a cleared state at the time of restarting twice.

Figure 11B:
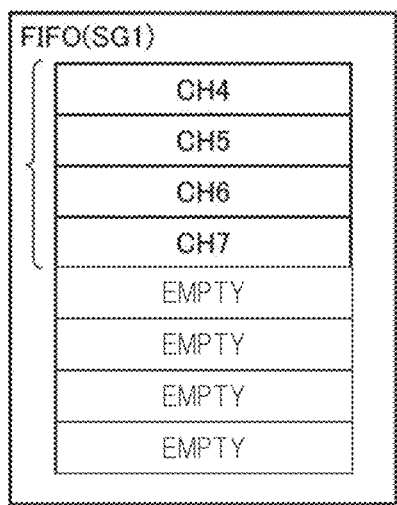
FIG. 11B is a diagram for explaining the FIFO memory M1 of the interruption processing of the high priority scan group according to the first embodiment.

Referring to FIG. 11B, a case in which the AD conversion channels CH4 to CH7 are stored at time T31 is shown. Until this state is reached, the FIFO memory M1 is in a cleared state at the time of restarting once.

In the case of this example, the FIFO memory M1 is cleared when restarting, so that no unnecessary data remains. Therefore, the FIFO memory M1 will not become full due to the residual unnecessary data.

Figure 12:
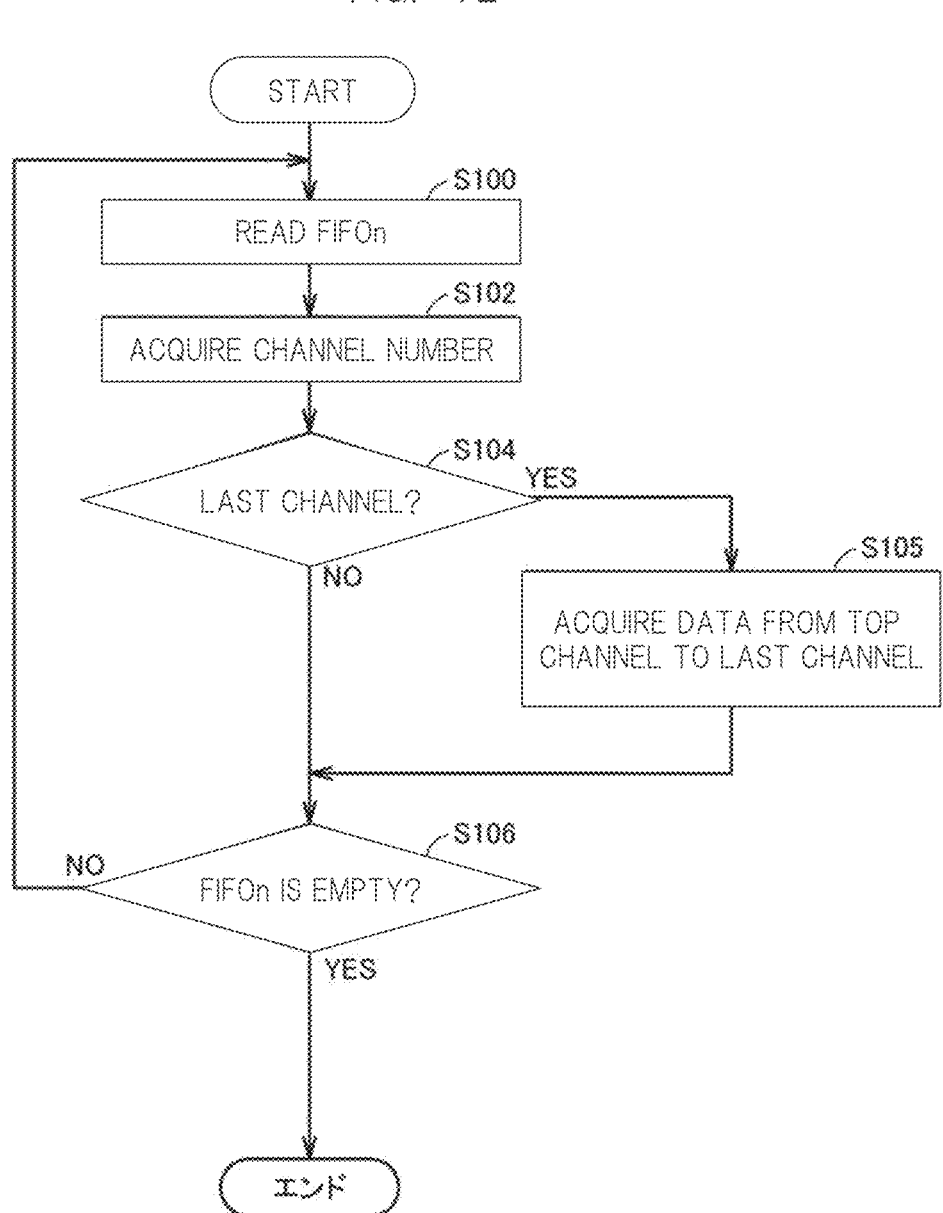
FIG. 12 is a diagram for explaining the reading from the FIFO memory according to the first embodiment.

FIG. 12 is a diagram for explaining read of the FIFO memory according to the first embodiment.

Referring to FIG. 12, a read processing of the FIFO memory Mn is performed (step S100). The read processing of the FIFO memory Mn is performed after the last AD conversion of the scan group SGn is completed and the last AD conversion channel CH is stored.

Next, the read channel number is acquired (step S102).

Next, it is determined whether the last channel is to be read based on the acquired channel number (step S104).

If it is determined in step S104 that the last channel is to be read (YES in step S104), the data from the top channel to the last channel is acquired (step S105).

Then, the processing ends (END).

Meanwhile, if it is determined in step S104 that the last channel is not read (NO in step S104), it is determined whether the FIFO memory Mn is empty (step S106).

If it is determined in step S106 that the FIFO memory Mn is not empty (NO in step S106), the processing returns to step S100 and the above processing is repeated.

In step S106, if it is determined that the FIFO memory Mn is empty, the processing ends (END).

Figure 13:
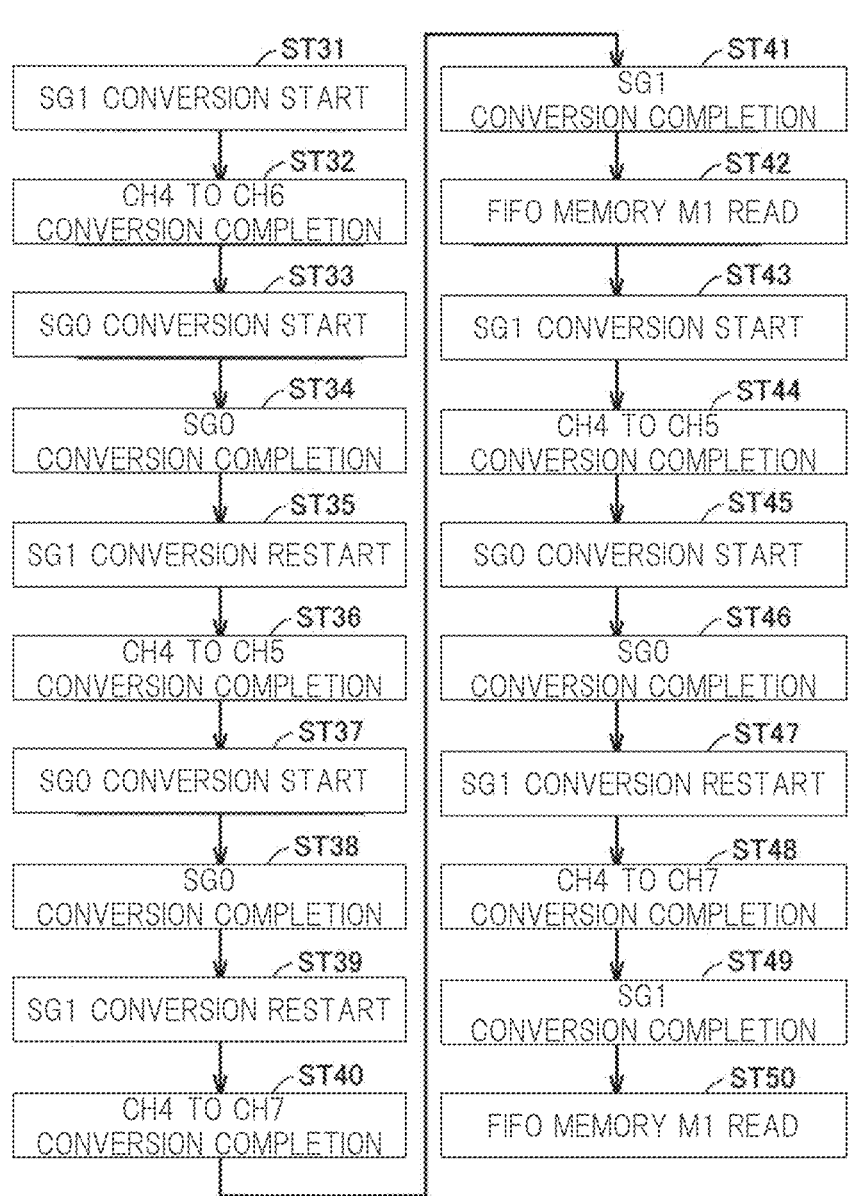
FIG. 13 is a flow diagram for explaining the flow of the AD conversion processing according to the first embodiment.

FIG. 13 is a flow diagram for explaining a flow of the AD conversion processing according to the first embodiment.

Referring to FIG. 13, the AD conversion of the scan group SG1 is started (step ST31). Next, the AD conversion of the AD conversion channels CH4 to CH6 is completed (step ST32). The number of pieces of data in the FIFO memory M1 is three. Next, the AD conversion of the scan group SG0 is started (step ST33). Consequently, the AD conversion of the scan group SG1 is interrupted. Next, the AD conversion of the scan group SG0 is completed (step ST34). Next, the AD conversion of the scan group SG1 is restarted (step ST35). At this restart, the pointer is set at the clear pointer position ("0"), so that the number of pieces of data in the FIFO memory M1 becomes 0. Next, the AD conversion of the AD conversion channels CH4 and CH5 is completed (step ST36). The number of pieces of data in the FIFO memory M1 is two.

Next, the AD conversion of the scan group SG0 is started (step ST37). Consequently, the AD conversion of the scan group SG1 is interrupted. Next, the AD conversion of the scan group SG0 ends (step ST38). Next, the AD conversion of the scan group SG1 is restarted (step ST39). At this restart, the pointer is set at the clear pointer position ("0"), so that the number of pieces of data in the FIFO memory M1 becomes 0.

Next, the AD conversion of the AD conversion channels CH4 to CH7 is completed (step ST40). Next, the AD conversion of the scan group SG1 is completed (step ST41). Next, the end of the AD conversion of the scan group SG1 is detected, and the data in the FIFO memory M1 is read out (step ST42). Consequently, the number of pieces of data in the FIFO memory M1 becomes zero.

Next, the AD conversion of the scan group SG1 is started (step ST43). Next, the AD conversion of the AD conversion channels CH4 and CH5 is completed (step ST44). The number of pieces of data in the FIFO memory M1 is two. Next, the AD conversion of the scan group SG0 is started (step ST45). Consequently, the AD conversion of the scan group SG1 is interrupted. Next, the AD conversion of the scan group SG0 ends (step ST46).

Next, the AD conversion of the scan group SG1 is restarted (step ST47). At this restart, the pointer is set at the clear pointer position ("0"), so that the number of pieces of data in the FIFO memory M1 becomes 0.

Next, the AD conversion of the AD conversion channels CH4 to CH7 is completed (step ST48). The number of pieces of data in the FIFO memory M1 is four. Next, the AD conversion of the scan group SG1 is completed (step ST49). Next, the end of the AD conversion of the scan group SG1 is detected, and the data in the FIFO memory M1 is read out (step ST50). Consequently, the number of pieces of data in the FIFO memory M1 becomes 0.

When the AD conversion channel is stored in the 8-stage FIFO memory M1 under a situation where the scan group SG1 is interrupted by the scan group SG0, the conversion result before the interruption of the scan group SG1 does not remain in the FIFO memory M1. Therefore, the full state of the FIFO memory does not occur, and the data read due to the software and the delete processing of the unnecessary data become unnecessary.

Therefore, this processing makes it possible to perform the high-speed A/D conversion processing.

Note that, in this example, a method in which the FIFO memory M1 is cleared at the time of restarting has been described, but the FIFO memory may be cleared at the timing of the conversion start or at the timing of the interruption.

Second Embodiment

Figure 14:
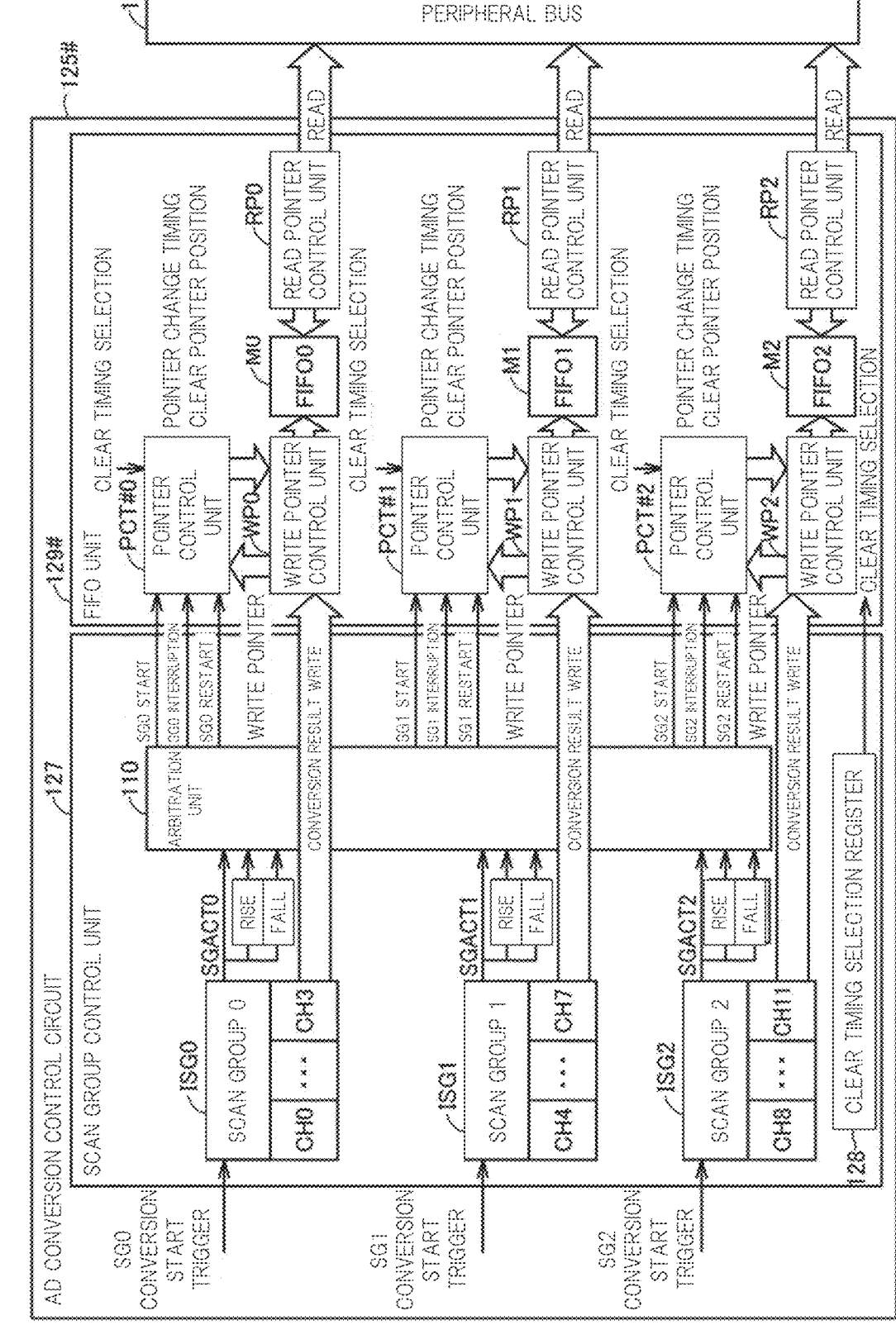
FIG. 14 is a diagram for explaining a configuration of an A/D conversion control circuit 125# according to a second embodiment.

FIG. 14 is a diagram for explaining a configuration of an A/D conversion control circuit 125# according to a second embodiment.

Referring to FIG. 14, the A/D conversion control circuit 125# differs from the A/D conversion control circuit 125 in that the FIFO unit 129 is replaced with the FIFO unit 129#.

The FIFO unit 129# differs in that the pointer control unit PCTn is replaced with the pointer control unit PCT#n.

Since the other configurations are the same, a detailed description thereof will not be repeated.

The pointer control unit PCT#n has a function of storing the write pointer position.

Figure 15:
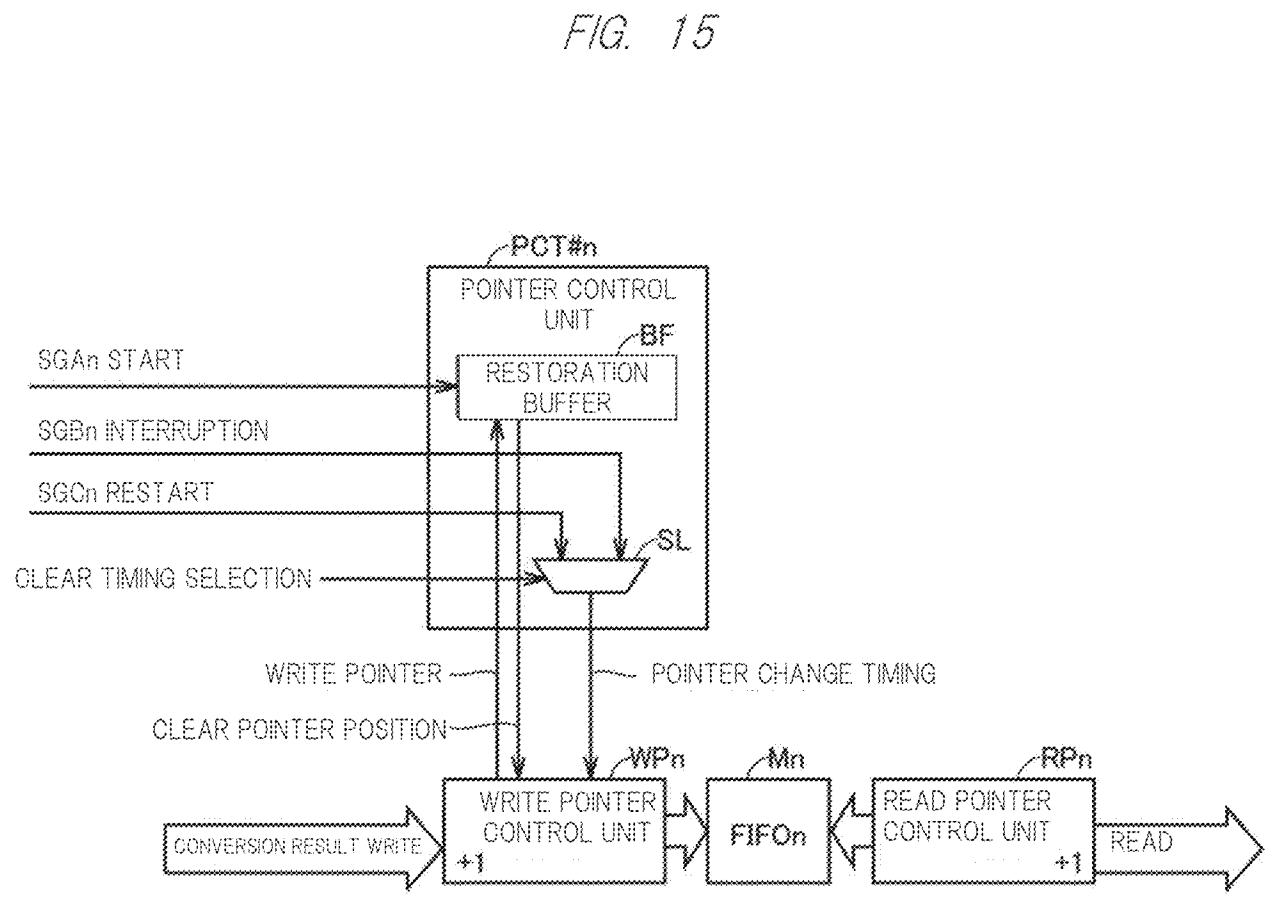

FIG. 15 is a diagram for explaining a configuration of the pointer control unit PCT#n according to the second embodiment.

Referring to FIG. 15, the pointer control unit PCT#n includes: a restoration buffer BF that stores a pointer position held by the write pointer control unit WPn according to a determination signal SGAn; and a selector SL that receives inputs of determination signals SGBn and SGCn to select one of them according to a clear timing signal. "n" can take any value. In this example, "n" ranges from 0 to 2.

The restoration buffer BF instructs the write pointer control unit WPn according to the input of the determination signal SGAn to obtain and store the pointer position of the write pointer control unit WPn. A value stored in the restoration buffer BF is held as the clear pointer position.

The clear timing selection signal is outputted based on the information stored in the clear timing selection register 128. The clear timing selection register 128 is configured by two bits, each corresponding to interruption or restart of the clear timing.

By setting any bit of the clear timing selection register 128, a clear timing selection signal ("1") is outputted to the selector SL.

For example, when a bit corresponding to the interruption of the clear timing selection register 128 is set to "1", the selector SL outputs the determination signal SGBn as a pointer change timing signal to the write pointer control unit WPn.

In this case, at the timing of interrupting the scan group SGn, the write pointer control unit WPn sets the pointer position to a position corresponding to the value stored in the restoration buffer BF.

Similarly, for example, when a bit corresponding to the restart of the clear timing selection register 128 is set to "1", the selector SL outputs the determination signal SGCn as a pointer change timing signal to the write pointer control unit WPn.

In this case, at the timing of restarting the scan group SGn, the write pointer control unit WPn sets the pointer position to a position corresponding to the value stored in the restoration buffer BF.

Figure 16:
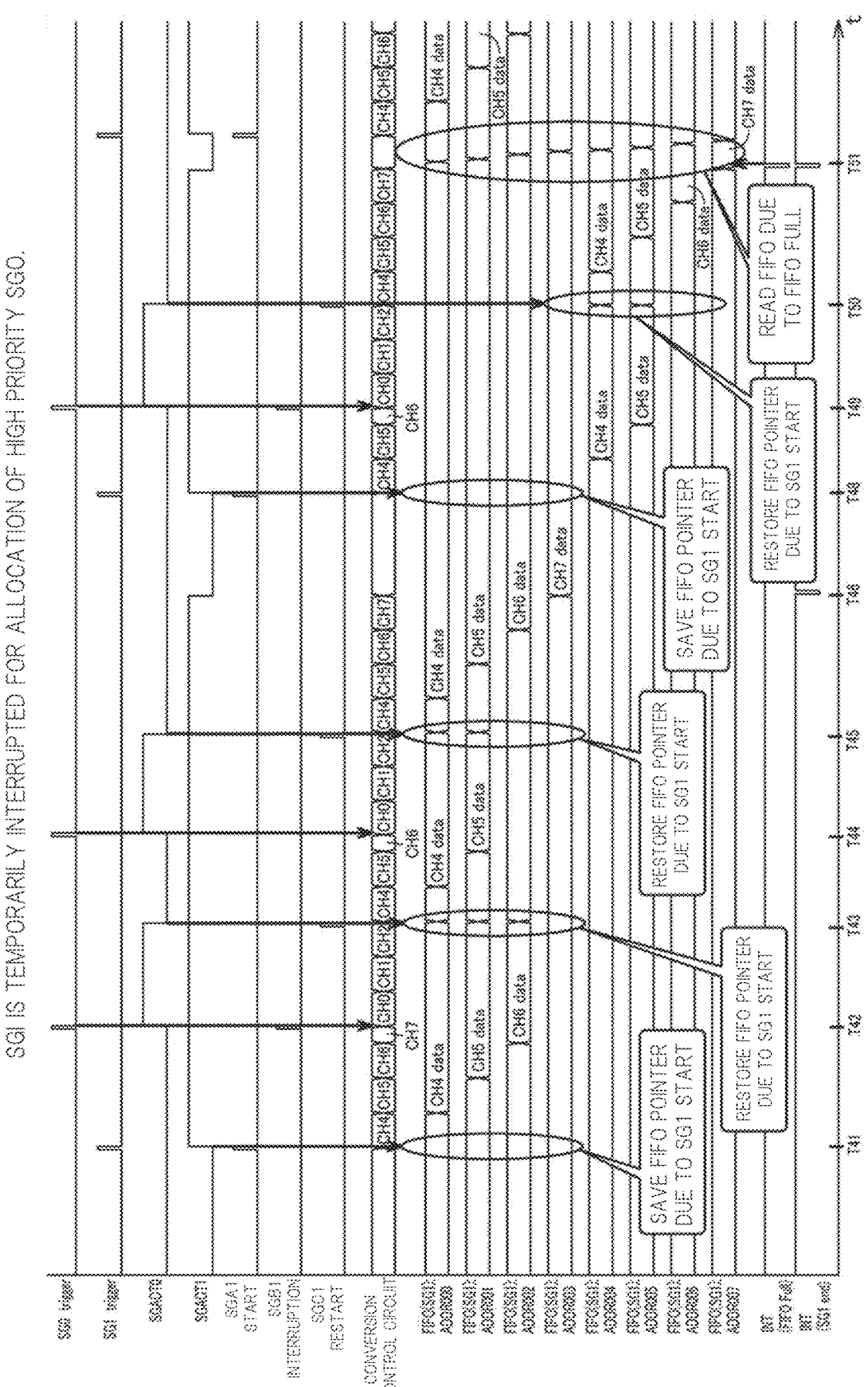
FIG. 16 is a diagram for explaining an interruption processing of a high-priority scan group according to the second embodiment.

FIG. 16 is a diagram for explaining an interruption processing of a high priority scan group according to the second embodiment.

In this example, the scan groups SG0 and SG1 will be described with reference to FIG. 16.

At time T41, the conversion start trigger of the scan group SG1 is inputted, and the AD conversion channel of the scan group SG1 is sequentially inputted to the input reception unit ISG1. The input reception unit ISG1 sets the control signal SGACT1 to 1.

Furthermore, with the control signal SGACT being set to "1", the determination signal SGA1 is set to "1". Accordingly, the restoration buffer BF of the pointer control unit PCT#1 stores the pointer position of the write pointer control unit WP1. In this example, the restoration buffer BF stores and holds "0".

Further, in this example, the following case is shown: the AD conversion channel CH6 is sequentially inputted from the AD conversion channel CH4 to the input reception unit ISG1 and is sequentially stored in the FIFO memory M1.

Then, at time T42 in the middle of timing at which the input reception unit ISG1 receives the AD conversion channel CH7, the conversion start trigger of the scan group SG0 is inputted. Consequently, the input reception unit ISG0 sets the control signal SGACT0 to 1. Then, the AD conversion of the scan group SG1 is interrupted. Then, the input reception unit ISG0 receives the AD conversion channels CH0 to CH2 of the scan group SG0 and sequentially stores them in the FIFO memory M0.

Next, at time T43, the input reception unit ISG0 accepts the conversion completion of the final AD conversion channel CH2 of the scan group SG0. Consequently, the control signal SGACT0 is set to 0. Then, with the restart of the AD conversion of the scan group SG1, the determination signal SGC1 is set to "1". Accordingly, the write pointer control unit WP1 is set at the pointer position ("0") based on the value stored in the restoration buffer BF.

In this example, the following case is shown: the AD conversion channel CH5 is sequentially inputted from the AD conversion channel CH4 to the input reception unit ISG1 and is sequentially stored in the FIFO memory M1.

Then, at time T44 in the middle of timing at which the input reception unit ISG1 receives the AD conversion channel CH6, the conversion start trigger of the scan group SG0 is inputted. Consequently, the input reception unit ISG0 sets the control signal SGACT0 to 1. Then, the AD conversion of the scan group SG1 is interrupted. Then, the input reception unit ISG0 receives the AD conversion channels CH0 to CH2 of the scan group SG0 and sequentially stores them in the FIFO memory M0.

Next, at time T45, the input reception unit ISG0 accepts the conversion completion of the final AD conversion channel CH2 of the scan group SG0. Consequently, the control signal SGACT0 is set to 0. Then, with restart of the AD conversion of the scan group SG1, the determination signal SGC1 is set to "1". Accordingly, the write pointer control unit WP1 is sets at the pointer position ("0") based on the value stored in the restoration buffer BF.

In this example, the following case is shown: the AD conversion channel CH7 is sequentially inputted from the AD conversion channel CH4 to the input reception unit ISG1 and is sequentially stored in the FIFO memory M1.

Then, at time T46, the final AD conversion channel CH7 is stored in the FIFO memory M1, and the AD conversion of the scan group SG1 is completed. Consequently, the control signal SGACT1 is set to 0.

Next, at time T48, the conversion start trigger of the scan group SG1 is inputted, and the AD conversion channel of the scan group SG1 is sequentially inputted to the input reception unit ISG1. The input reception unit ISG1 sets the control signal SGACT1 to 1.

Furthermore, with the control signal SGACT being set to "1", the determination signal SGA1 is set to "1". Accordingly, the restoration buffer BF of the pointer control unit PCT#1 stores the pointer position of the write pointer control unit WP1. In this example, the restoration buffer BF stores and holds "4".

In this example, the following case is shown: the AD conversion channel CH5 is sequentially inputted from the AD conversion channel CH4 to the input reception unit ISG1 and is sequentially stored in the FIFO memory M1.

Then, at time T49 in the middle of timing at which the input reception unit ISG1 receives the AD conversion channel CH6, the conversion start trigger of the scan group SG0 is inputted. Consequently, the input reception unit ISG0 sets the control signal SGACT0 to 1. Then, the AD conversion of the scan group SG1 is interrupted. Then, the input reception unit ISG0 receives the AD conversion channels CH0 to CH2 of the scan group SG0 and sequentially stores them in the FIFO memory M0.

Next, at time T50, the input reception unit ISG0 accepts the conversion completion of the final AD conversion channel CH2 of the scan group SG0. Consequently, the control signal SGACT0 is set to 0. Then, with restart of the AD conversion of the scan group SG1, the determination signal SGC1 is set to "1". Accordingly, the write pointer control unit WP1 sets a pointer position ("4") based on the value stored in the restoration buffer BF.

In this example, the following case is shown: the AD conversion channel CH7 is sequentially inputted from the AD conversion channel CH4 to the input reception unit ISG1 and is sequentially stored in the FIFO memory M1.

Then, at time T51, the final AD conversion channel CH7 is stored in the FIFO memory M1, and the AD conversion of the scan group SG1 is completed. Consequently, the control signal SGACT1 is set to 0.

Furthermore, a case in which the FIFO memory M1 is in a full state at time T51 is shown. Consequently, the read of the data of the FIFO memory M1 is performed.

FIG. 17 is a diagram for explaining an interruption processing of the FIFO memory M1 of the high priority scan group according to the second embodiment.

Figure 17A:
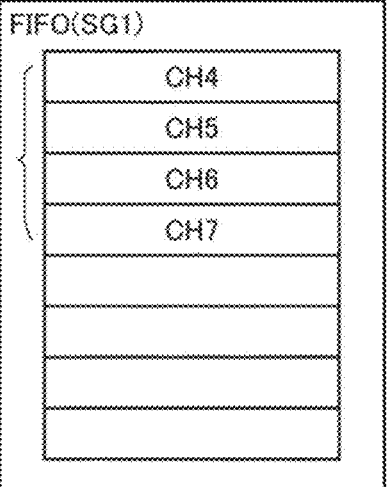
FIG. 17A is a diagram for explaining a FIFO memory M1 of an interruption processing of the high-priority scan group according to the second embodiment.

Referring to FIG. 17A, in this example, it is assumed, as one example, that the FIFO memory M1 is provided with an eight-stage storage area.

A case in which the AD conversion channels CH4 to CH7 are stored at time T46 is shown. Before reaching this state, the pointer of the FIFO memory M1 has been set at a position corresponding to the value ("0") stored in the restoration buffer BF at the time of restarting twice.

Figure 17B:
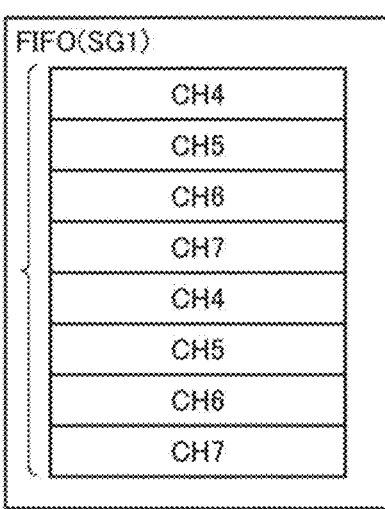
FIG. 17B is a diagram for explaining the FIFO memory M1 of the interruption processing of the high-priority scan group according to the second embodiment.

Referring to FIG. 17B, a case in which the AD conversion channels CH4 to CH7 are stored at time T51 is shown. Before this state is reached, the pointer of the FIFO memory M1 is set at a position corresponding to the value ("4") stored in the restoration buffer BF at the time of restarting once.

In the case of this example, the value of the pointer of the FIFO memory M1 is stored in the restoration buffer BF at the start, and the pointer of the FIFO memory M1 is set at the position corresponding to the value stored in the restoration buffer BF at the time of restart. Therefore, when the AD conversion is interrupted and restarted, the value of the pointer in FIFO memory M1 at the time of the start is reset, so the data remaining in the FIFO memory M1 at the time of interruption is reset and the unnecessary data does not remain in the FIFO memory M1.

Also, the read is performed when the FIFO memory M1 is in a full state. Therefore, it is possible to effectively utilize the eight-stage storage areas of the FIFO memory M1.

For example, it is desirable to set the number of stages of the FIFO memory M to be an integral multiple of the total number of AD conversion channels of the scan group SG. This makes it possible to fully utilize the storage area of the FIFO memory M.

Regarding the read of the FIFO memory according to the second embodiment, the read processing is performed when the FIFO memory is in the full state, but not after the last AD conversion of the scan group SGn has been completed and the last AD conversion channel CH has been stored. A specific processing(s) is the same as that described in the flowchart of FIG. 12, so that a detailed description thereof will not be repeated.

Figure 18:
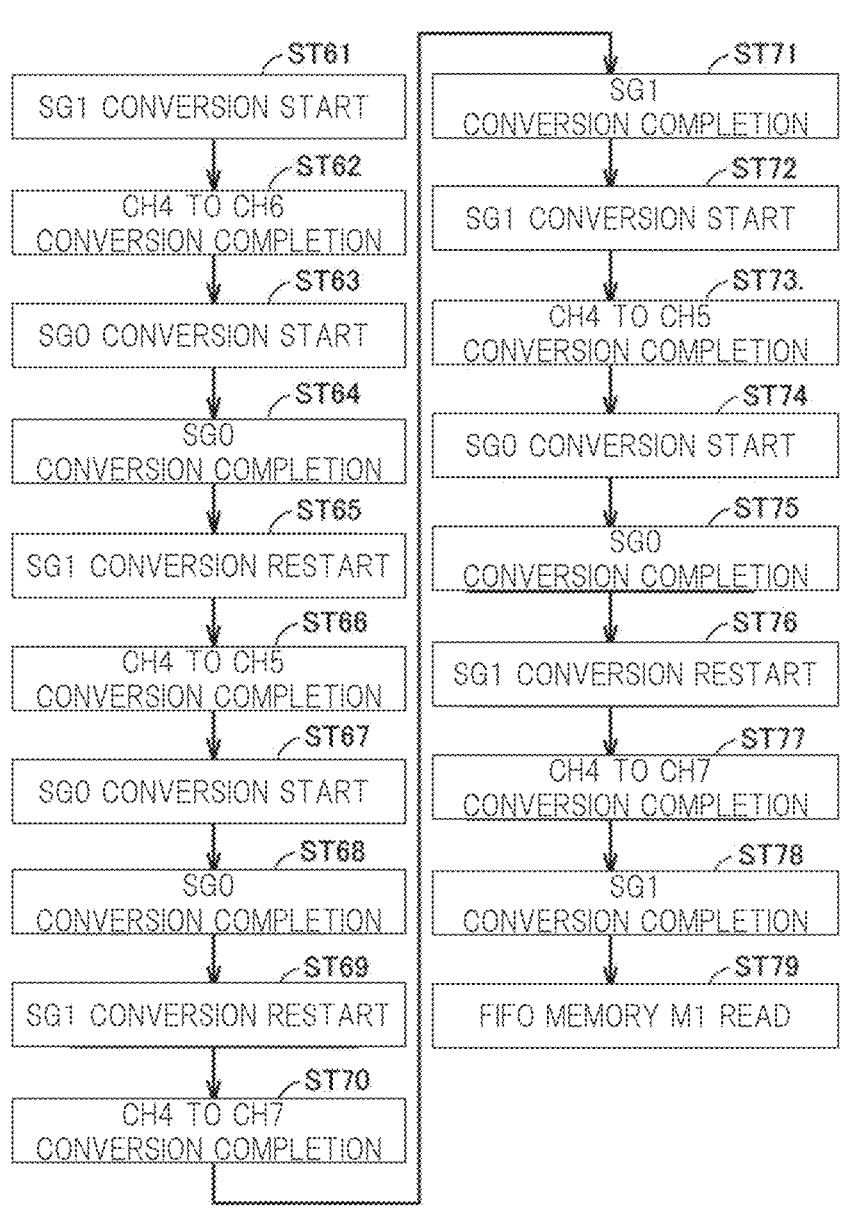
FIG. 18 is a flow diagram for explaining a flow of an AD conversion processing according to the second embodiment.

FIG. 18 is a flow diagram for explaining a flow of an AD conversion processing according to a second embodiment.

Referring to FIG. 18, the AD conversion of the scan group SG1 is started (step ST61). At the time of this start, the restoration buffer BF of the pointer control unit PCT#1 stores and holds the pointer position ("0") of the write pointer control unit WP1. Next, the AD conversion of the AD conversion channels CH4 to CH6 is completed (step ST62). The number of pieces of data in the FIFO memory M1 is three. Next, the AD conversion of the scan group SG0 is started (step ST63). Consequently, the AD conversion of the scan group SG1 is interrupted. Next, the AD conversion of the scan group SG0 is completed (step ST64). Next, the AD conversion of the scan group SG1 is restarted (step ST65). At this restart, to set the pointer at the pointer position ("0") stored in the restoration buffer BF, the number of pieces of data in the FIFO memory M1 becomes 0. Next, the AD conversion of the AD conversion channels CH4 and CH5 is completed (step ST66). The number of pieces of data in the FIFO memory M1 is two.

Next, the AD conversion of the scan group SG0 is started (step ST67). Consequently, the AD conversion of the scan group SG1 is interrupted. Next, the AD conversion of the scan group SG0 is completed (step ST68). Next, the AD conversion of the scan group SG1 is restarted (step ST69). At this restart, to set the pointer at the pointer position ("0") stored in the restoration buffer BF, the number of pieces of data in the FIFO memory M1 becomes 0.

Next, the AD conversion of the AD conversion channels CH4 to CH7 is completed (step ST70). Next, the AD conversion of the scan group SG1 is completed (step ST71). Next, the AD conversion of the scan group SG1 is started (step ST72). At this start, the restoration buffer BF of the pointer control unit PCT#1 stores and holds the pointer position ("4") of the write pointer control unit WP1.

Next, the AD conversion of the AD conversion channels CH4 and CH5 is completed (step ST73). The number of pieces of data in the FIFO memory M1 is 2. Next, the AD conversion of the scan group SG0 is started (step ST74). Consequently, the AD conversion of the scan group SG1 is interrupted. Next, the AD conversion of the scan group SG0 is completed (step ST75).

Next, the AD conversion of the scan group SG1 is restarted (step ST76). At this restart, to set the pointer at the pointer position ("4") stored in the restoration buffer BF, the number of pieces of data in the FIFO memory M1 becomes 0.

Next, the AD conversion of the AD conversion channels CH4 to CH7 is completed (step ST77). The number of pieces of data in the FIFO memory M1 is 8. Next, the AD conversion of the scan group SG1 is completed (step ST78). Next, the data in the FIFO memory M1 is read (step ST79). Consequently, the number of pieces of data in the FIFO memory M1 becomes 0.

When the AD conversion channels in the 8-stage FIFO memory M1 is interrupted under a situation where the scan group SG1 is interrupted by the scan group SG0, the FIFO memory M1 is set at the pointer position stored in the restoration buffer BF at the restart, so that the conversion result of the scan group SG1 before the interruption does not remain in the FIFO memory M1. Therefore, no unnecessary data remains in the FIFO memory M1, and the data read by the software and the deletion processing for the unnecessary become unnecessary.

Therefore, this processing makes it possible to perform the high-speed A/D conversion processing.

Note that, in this example, the method in which the pointer of the FIFO memory M1 is set at the pointer position stored in the restoration buffer BF at the time of the restart has been explained, but the pointer of the FIFO memory M1 may be set at the pointer position stored in the restoration buffer BF at the timing of the interruption.

Application Example

Figure 19:
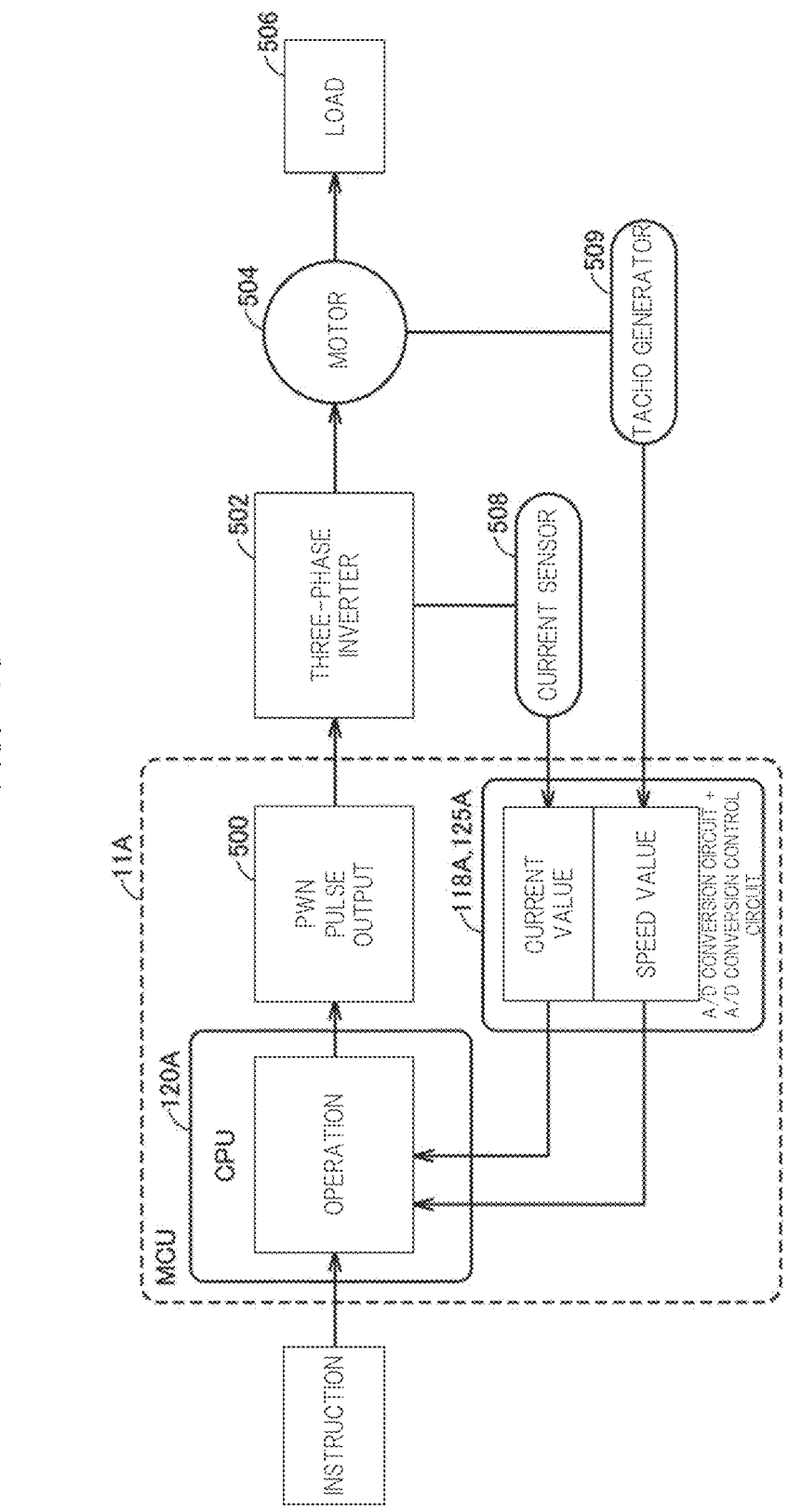
FIG. 19 is a diagram for explaining a first application example.

FIG. 19 is a diagram for explaining a first application example.

Referring to FIG. 19, in this example, the following case is shown: a motor 504 that drives a load 506, a three-phase inverter 502 that drives the motor 504, and an MCU 11A that controls the three-phase inverter 502 are provided. The motor 504 is provided with a tacho generator 509 for detecting a motor speed. Furthermore, the three-phase inverter 502 is provided with a current sensor 508 that detects a current in order to detect a rotor position of the motor 504.

A detection value detected by the current sensor 508 is fed back to the MCU 11A. Further, a detection value detected by the tacho generator 509 is fed back to the MCU 11A.

The MCU 11A includes a CPU 120A that performs calculation on instructions, a pulse generation circuit 500 that outputs a PWM pulse to the three-phase inverter 502 based on a calculation result of the CPU 120A, and an A/D conversion circuit 118A and an A/D conversion control circuit 125A that convert analog signals into a digital value(s), the analog signals being the detection values of the current sensor 508 and the tacho generator 509.

For example, when the data stored in the FIFO memory is used instantly, it is possible to apply the A/D conversion circuit 118A and the A/D conversion control circuit 125A described in the above first embodiment.

FIG. 20 is a diagram for explaining a second application example.

Referring to FIG. 20, the following case is shown: an amplifier 510 that amplifies an analog signal 512 is provided, and an MCU 11B that receives an input of the signal from the amplifier 510 is provided.

The MCU 11B includes an A/D conversion circuit 118B and an A/D conversion control circuit 125B that convert an analog signal amplified by the amplifier 510 into a digital value, and a CPU 120B that performs an arithmetic processing based on the converted digital signal.

For example, if it is unnecessary to use the data stored in the FIFO memory instantly, it is possible to apply the A/D conversion circuit 118B and the A/D conversion control circuit 125B described in the above second embodiment.

Figure 21:
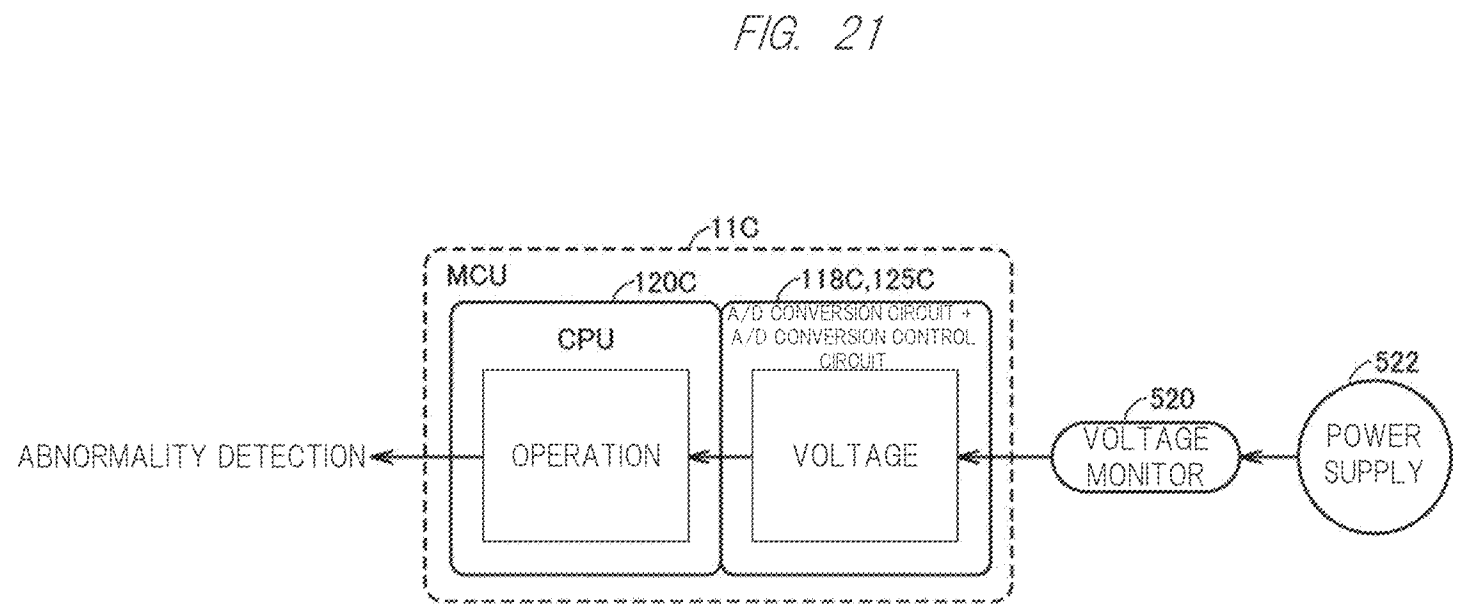

FIG. 21 is a diagram for explaining a third application example.

Referring to FIG. 21, a case in which a voltage monitor 520, which monitors a power supply 522, and an MCU 11C are provided is shown.

The MCU 11C includes an A/D conversion circuit 118C and an A/D conversion control circuit 125C that convert an analog signal(s) monitored by the voltage monitor 520 into a digital value(s), and a CPU 120C that performs an arithmetic processing(s) based on the converted digital signal. As one example, the CPU 120C can perform abnormality detection based on the voltage value detected by the voltage monitor 520.

For example, in the case of the abnormality detection as in this example, it is possible to apply the A/D conversion circuit 118C and the A/D conversion control circuit 125C described in the above first embodiment 1 or 2.

Although the present disclosure has been specifically described above based on the embodiments, it goes without saying that the present disclosure is not limited to the embodiments and can be modified in various ways without departing from the gist thereof.

What is claimed is:

1. An analog/digital (A/D) conversion control circuit comprising:
    a scan group control unit controlling a plurality of A/D conversion channels with a plurality of scan groups having different priorities; and
    a First In First Out (FIFO) unit provided to correspond to each of the plurality of scan groups, each FIFO unit having a plurality of FIFO memories that sequentially stores an output from the scan group control unit for each corresponding scan group, wherein the scan group control unit includes:

an input reception unit receiving an A/D conversion channel of a corresponding scan group among the plurality of A/D conversion channels according to an instruction, and outputting the received A/D conversion channel to the corresponding FIFO memory, the input reception unit further receiving a conversion start trigger of the corresponding scan group, and outputting, to an arbitration unit, a control signal indicating that A/D conversion of the corresponding scan group is active, the control signal being asserted from a start of A/D conversion of the corresponding scan group until a last A/D conversion channel of the corresponding scan group is received, and outputting information indicating a rise and a fall of the control signal; and the arbitration unit determining timing of conversion start, interruption, and restart in each of the plurality of scan groups based on the control signal and the information indicating the rise and the fall of the control signal, wherein the FIFO unit further includes a plurality of pointer control units provided correspondingly to the plurality of FIFO memories, respectively, wherein each of the plurality of pointer control units includes a clear timing selection register configured to select, from among the conversion start, the interruption, and the restart determined by the arbitration unit, at least one event as a pointer-clear timing, and a selector configured to output a clear timing selection signal based on information stored in the clear timing selection register, wherein each of the pointer control units clears or changes a write pointer and a read pointer of the corresponding FIFO memory based on a determination signal output from the arbitration unit at the selected timing according to a priority of the corresponding scan group, wherein each of the pointer control units includes a restoration buffer configured to store a position of the write pointer at the start of the corresponding scan group based on the determination signal, and to set the write pointer at the interruption and the restart of the corresponding scan group to a position corresponding to a value stored in the restoration buffer, and wherein each corresponding FIFO memory performs a read processing by using the read pointer after the last A/D conversion channel of the corresponding scan group is stored.

2. The A/D conversion control circuit according to claim 1, wherein each FIFO memory has a number of stages set to an integral multiple of a total number of AD conversion channels included in the corresponding scan group.

3. The A/D conversion control circuit according to claim 1, wherein each of the pointer control units outputs a clear signal that clears or changes a position of a write pointer or a read pointer of the corresponding FIFO memory at the timing of at least one of the start, the interruption, and the restart of the corresponding scan group based on a combination of a timing signal output from the arbitration unit at times of conversion start, interruption, and restart by the corresponding scan group, and a clear timing selection signal.

4. The A/D conversion control circuit according to claim 1, wherein the arbitration unit determines timing of conversion start, interruption, and restart for each of the plurality of scan groups based on rise and fall of a conversion start trigger in corresponding scan group.

\* \* \* \* \*